US012427770B2

(12) United States Patent
Takabe et al.

(10) Patent No.: US 12,427,770 B2
(45) Date of Patent: Sep. 30, 2025

(54) LIQUID EJECTING HEAD AND LIQUID EJECTING APPARATUS

(71) Applicant: SEIKO EPSON CORPORATION, Tokyo (JP)

(72) Inventors: Motoki Takabe, Shiojiri (JP); Eiju Hirai, Azumino (JP); Masaki Mori, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 172 days.

(21) Appl. No.: 18/512,270

(22) Filed: Nov. 17, 2023

(65) Prior Publication Data

US 2024/0165951 A1 May 23, 2024

(30) Foreign Application Priority Data

Nov. 18, 2022 (JP) ................................ 2022-184619

(51) Int. Cl.
*B41J 2/14* (2006.01)

(52) U.S. Cl.
CPC ................................ *B41J 2/14233* (2013.01)

(58) Field of Classification Search
CPC ................ B41J 2/14233; B41J 2/14274; B41J 2002/14241; B41J 2/161; B41J 2/1623; B41J 2002/14491
See application file for complete search history.

(56) References Cited

FOREIGN PATENT DOCUMENTS

EP 1101615 A1 * 5/2001 .......... B41J 2/14233
JP 2015-033834 A 2/2015

OTHER PUBLICATIONS

Shimada Masato, "Ink-jet Recording Head And Ink-jet Recording Apparatus" (EP 1 101 615 A1), May 23, 2001, [Abstract and Paragraphs 0088-0096] (Year: 2001).*

* cited by examiner

*Primary Examiner* — Lisa Solomon
(74) *Attorney, Agent, or Firm* — Harness, Dickey & Pierce, P.L.C.

(57) ABSTRACT

A liquid ejecting head includes: a piezoelectric element that includes a first drive electrode, a piezoelectric body, and a second drive electrode in a lamination direction; a vibration plate that is provided on one side of the lamination direction with respect to the piezoelectric element and is deformed by driving of the piezoelectric element; a pressure chamber substrate that is provided on the one side of the lamination direction with respect to the vibration plate and is provided with a plurality of pressure chambers; an interlayer that is laminated on at least one of the piezoelectric body, the vibration plate, or the pressure chamber substrate and of which capacitance changes according to humidity; a first detection electrode that is in contact with the interlayer; and a second detection electrode that is in contact with the interlayer and is disposed to be separated from the first detection electrode.

15 Claims, 16 Drawing Sheets

LIQUID EJECTING HEAD AND LIQUID EJECTING APPARATUS

The present application is based on, and claims priority from JP Application Serial Number 2022-184619, filed Nov. 18, 2022, the disclosure of which is hereby incorporated by reference herein in its entirety.

BACKGROUND

1. Technical Field

The present disclosure relates to a liquid ejecting head and a liquid ejecting apparatus.

2. Related Art

There is known a liquid ejecting head including a pressure chamber plate provided with pressure chambers, a vibration plate for generating a pressure in the pressure chamber, and a piezoelectric actuator including a piezoelectric element provided on the vibration plate. For example, JP-A-2015-33834 discloses that a piezoelectric actuator is covered with a case portion and a humidity sensor is provided in a space inside the case portion. JP-A-2015-33834 is an example of the related art.

Performance of the piezoelectric actuator or a member in the vicinity of the piezoelectric actuator may be deteriorated because of an influence of humidity. The technique in the related art does not propose, for example, a specific structure for adopting a humidity sensor, such as a structure of the humidity sensor itself, a disposition position of the humidity sensor with respect to the piezoelectric actuator and the member in the vicinity of the piezoelectric actuator, and the like. As a result, in the technique in the related art, there is a possibility that information on humidity in the piezoelectric actuator or the member in the vicinity of the piezoelectric actuator cannot be appropriately acquired.

SUMMARY

According to an aspect of the present disclosure, a liquid ejecting head is provided. A liquid ejecting head includes: a piezoelectric element that includes a first drive electrode, a second drive electrode, and a piezoelectric body, the piezoelectric body being provided between the first drive electrode and the second drive electrode in a lamination direction in which the first drive electrode, the second drive electrode, and the piezoelectric body are laminated; a vibration plate that is provided on one side of the lamination direction with respect to the piezoelectric element and is deformed by driving of the piezoelectric element; a pressure chamber substrate that is provided on the one side of the lamination direction with respect to the vibration plate and is provided with a plurality of pressure chambers; an interlayer that is laminated on at least one of the piezoelectric body, the vibration plate, or the pressure chamber substrate and of which capacitance changes according to humidity; a first detection electrode that is in contact with the interlayer; and a second detection electrode that is in contact with the interlayer and is disposed to be separated from the first detection electrode.

DESCRIPTION OF EMBODIMENTS

A1. First Embodiment

Figure 1:
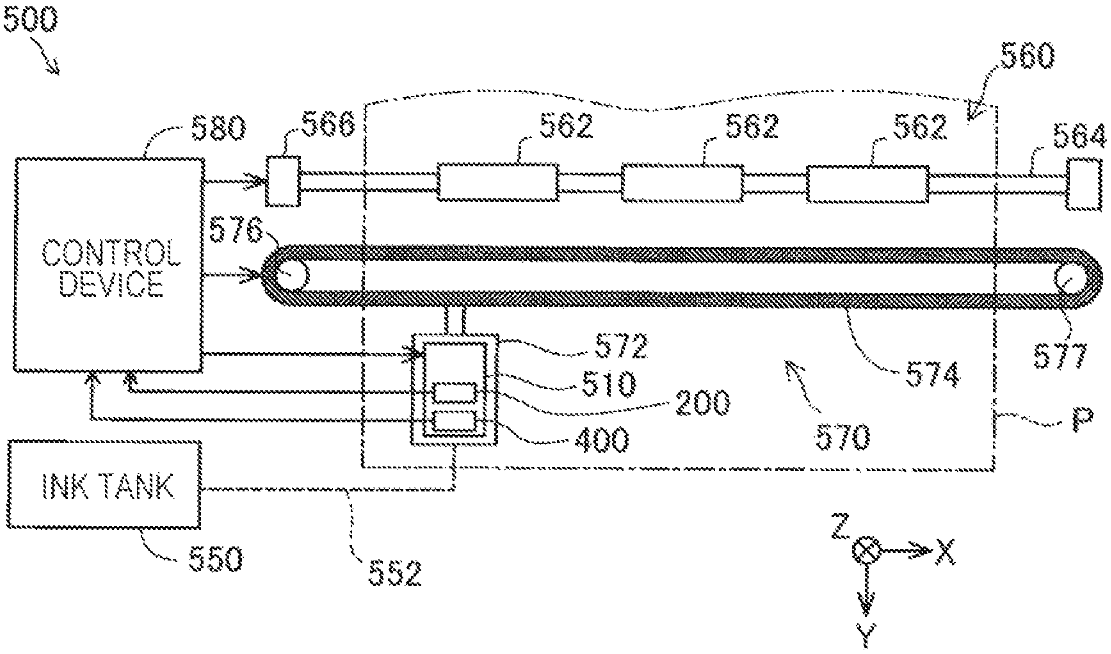
FIG. 1 is an explanatory diagram illustrating a schematic configuration of a liquid ejecting apparatus according to a first embodiment.

FIG. 1 is an explanatory diagram illustrating a schematic configuration of a liquid ejecting apparatus 500 as a first embodiment of the present disclosure. In the present embodiment, the liquid ejecting apparatus 500 is an ink jet printer that forms an image by ejecting ink as an example of a liquid onto printing paper P. The liquid ejecting apparatus 500 may use any kind of medium, such as a resin film or a cloth, as a target on which ink is to be ejected, instead of the printing paper P. X, Y, and Z illustrated in FIG. 1 and each of the drawings subsequent to FIG. 1 represent three spatial axes orthogonal to each other. In the present specification, directions along the axes are also referred to as an X-axis direction, a Y-axis direction, and a Z-axis direction. When specifying the direction, a positive direction is "+" and a negative direction is "−" so that positive and negative signs are used together in the direction notation, and description will be given when a direction to which an arrow faces in each of the drawings is the + direction and an opposite direction thereof is the − direction. In the present embodiment, the Z-axis direction coincides with a vertical direction, the +Z direction indicates vertically downward, and the −Z direction indicates vertically upward. Further, when the positive direction and the negative direction are not limited, the three X, Y, and Z will be described as the X-axis, the Y-axis, and the Z-axis.

The liquid ejecting apparatus 500 includes a liquid ejecting head 510, an ink tank 550, a transport mechanism 560, a moving mechanism 570, and a control device 580. The liquid ejecting head 510 is configured with a plurality of nozzles, ejects inks of a total of four colors, for example, black, cyan, magenta, and yellow in the +Z direction to form an image on a printing paper P. The liquid ejecting head 510 is mounted on a carriage 572 and reciprocates in main scanning directions with the movement of the carriage 572. In the present embodiment, the main scanning directions are the +X direction and the −X direction. The liquid ejecting head 510 may further eject ink of a random color such as light cyan, light magenta, or white, and transparent ink in addition to the four colors.

The ink tank 550 accommodates the ink to be ejected to the liquid ejecting head 510. The ink tank 550 is coupled to the liquid ejecting head 510 by a resin tube 552. The ink in the ink tank 550 is supplied to the liquid ejecting head 510 via the tube 552. Instead of the ink tank 550, a bag-shaped liquid pack formed of a flexible film may be provided.

The transport mechanism 560 transports the printing paper P in a sub-scanning direction. The sub-scanning direction is a direction that intersects with the X-axis direction, which is a main scanning direction, and is the +Y direction and the −Y direction in the present embodiment. The transport mechanism 560 includes a transport rod 564, on which three transport rollers 562 are mounted, and a transport motor 566 for rotatably driving the transport rod 564. When the transport motor 566 rotatably drives the transport rod 564, the printing paper P is transported in the +Y direction, which is the sub-scanning direction. The number of the transport rollers 562 is not limited to three and may be a random number. Further, a configuration in which a plurality of transport mechanisms 560 are provided may be provided.

The moving mechanism 570 includes a carriage 572, a transport belt 574, a moving motor 576, and a pulley 577. The carriage 572 mounts the liquid ejecting head 510 in a state where the ink can be ejected. The carriage 572 is fixed to the transport belt 574. The transport belt 574 is bridged between the moving motor 576 and the pulley 577. When the moving motor 576 is rotatably driven, the transport belt 574 reciprocates in the main scanning direction. Thereby, the carriage 572 fixed to the transport belt 574 also reciprocates in the main scanning direction.

Figure 2:
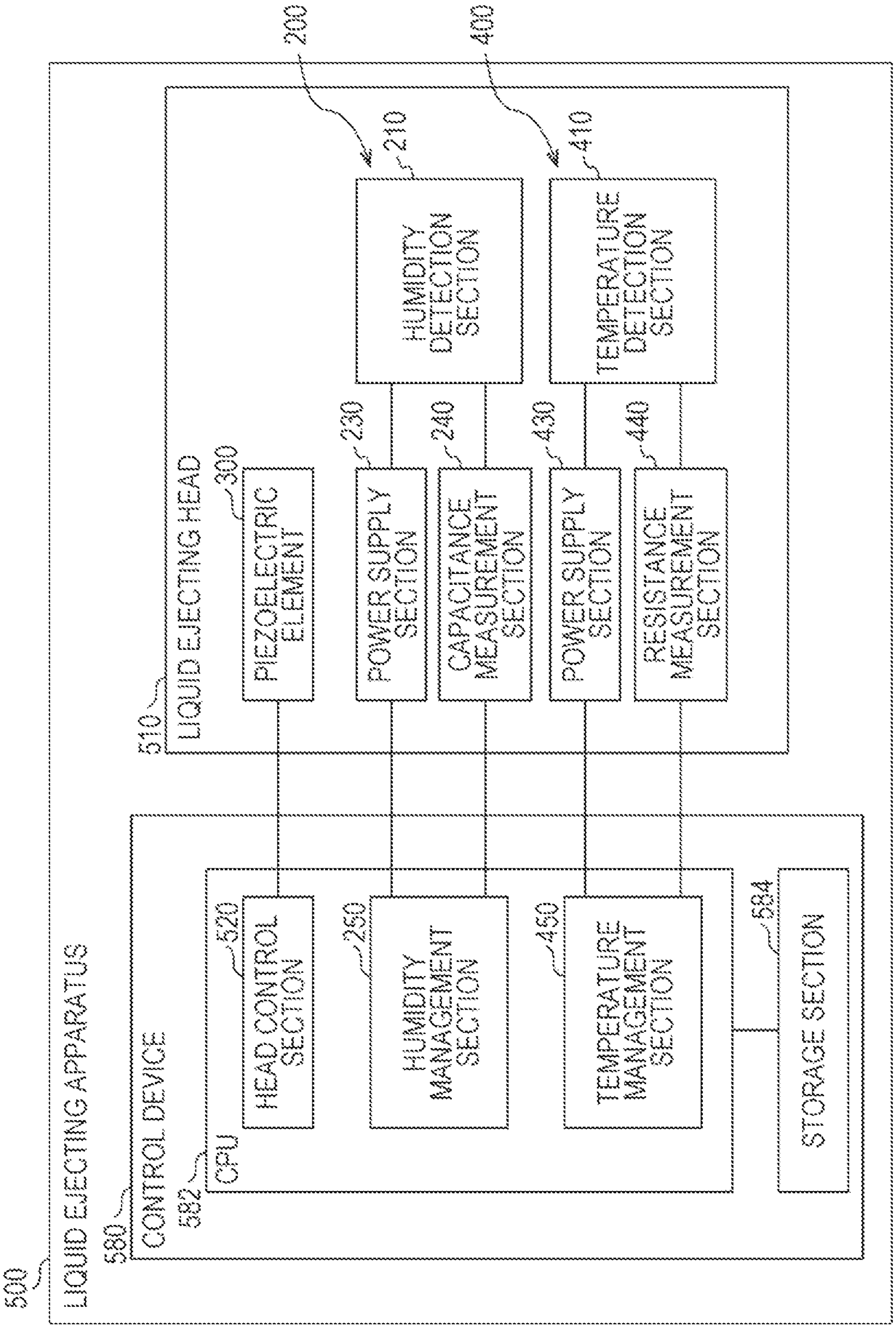
FIG. 2 is a block diagram illustrating a functional configuration of the liquid ejecting apparatus.

FIG. 2 is a block diagram illustrating a functional configuration of the liquid ejecting apparatus 500. In FIG. 2, a partial configuration of the liquid ejecting apparatus 500 such as the ink tank 550, the transport mechanism 560, and the moving mechanism 570 is omitted. As illustrated in FIG. 2, the liquid ejecting head 510 includes a piezoelectric element 300, a humidity detection mechanism 200, and a temperature detection mechanism 400.

The piezoelectric element 300 causes a pressure change in the ink in the pressure chamber of the liquid ejecting head 510. The humidity detection mechanism 200 functions as a so-called electric humidity sensor, and acquires information on humidity in a member included in the liquid ejecting head 510, such as the piezoelectric element 300, or a member on the periphery of the humidity detection mechanism 200. “Information on humidity” includes, for example, an amount of moisture absorbed or dehumidified from a member, relative humidity and absolute humidity which indicate an amount of moisture contained in the air, a degree of an influence on performance of a member because of moisture absorption or dehumidification, and information used to acquire such information, such as a resistance value or a capacitance value. The “degree of an influence on performance of a member” may include the presence or absence of a failure of the member, a temporal change in the performance of the member, and the like.

As illustrated in FIG. 2, the humidity detection mechanism 200 includes a humidity detection section 210, a humidity-detection power supply section 230, and a capacitance measurement section 240. In the present embodiment, the humidity detection section 210 is configured with a capacitance type humidity sensor, and utilizes a property that the dielectric constant changes and the capacitance changes because of moisture absorption of the measurement target. The humidity-detection power supply section 230 applies a predetermined voltage to the humidity detection section 210 under a control of the humidity management section 250. The capacitance measurement section 240 detects capacitance of the humidity detection section 210 by using a method of measuring a time until a voltage value of the voltage applied to the humidity detection section 210 by the humidity-detection power supply section 230 reaches a predetermined reference voltage. A detection result by the capacitance measurement section 240 is output to the humidity management section 250. The capacitance may be measured by using various general methods such as a constant current discharge method. The humidity-detection power supply section 230 and the capacitance measurement section 240 may be provided in the control device 580.

The temperature detection mechanism 400 functions as a temperature sensor that detects a temperature of the ink in a pressure chamber to be described later. Specifically, the temperature detection mechanism 400 detects a temperature of a resistance wiring by using a characteristic that a resistance value of a resistance wiring of a metal, a semiconductor, or the like changes depending on a temperature, and estimates the detected temperature of the resistance wiring as a temperature of the ink in the pressure chamber.

The temperature detection mechanism 400 includes a temperature detection section 410, a temperature-detection power supply section 430, and a temperature-detection resistance measurement section 440. The temperature detection section 410 is configured with a conductor wiring including a resistor for temperature detection. The temperature-detection power supply section 430 is, for example, a constant current circuit, and causes a predetermined current to flow through the temperature detection section 410 under a control of a temperature management section 450. The temperature-detection resistance measurement section 440 acquires a resistance value of a temperature detection resistor of the temperature detection section 410 based on a current value of a current flowing through the temperature detection section 410 by the temperature-detection power supply section 430 and a voltage value of a voltage generated in the temperature detection section 410. A detection result by the temperature-detection resistance measurement section 440 is output to the temperature management section 450. The temperature-detection power supply section 430 and the temperature-detection resistance measurement section 440 may be provided in the control device 580.

As illustrated in FIG. 2, the control device 580 is configured as a microcomputer including a CPU 582 and a storage section 584. The control device 580 is mounted on, for example, a wiring substrate 120 or a circuit substrate directly or indirectly coupled to the wiring substrate 120. As the storage section 584, for example, a non-volatile memory such as EEPROM in which data can be erased by an electrical signal, a non-volatile memory such as One-Time-PROM or EPROM in which data can be erased by ultraviolet rays, a non-volatile memory such as PROM in which data cannot be erased, and the like can be used. The storage section 584 stores various programs for realizing functions provided in the present embodiment. The CPU 582 functions as a head control section 520, a humidity management section 250, and a temperature management section 450 by developing and executing a program stored in the storage section 584. The control device 580 may further include a communication section for transmitting and receiving a humidity detection result or a temperature detection result to and from a predetermined server.

The head control section 520 collectively performs a control of each section of the liquid ejecting head 510, such as an ejecting operation. The head control section 520 may control, for example, a reciprocating operation of the carriage 572 along the main scanning direction, and a transport operation of the printing paper P along the sub-scanning direction, in addition to the control of the liquid ejecting head 510. As an ejecting operation of the liquid ejecting head 510, the head control section 520 can control ejection of the ink onto the printing paper P by, for example, outputting a drive signal to the liquid ejecting head 510 to drive the piezoelectric element 300, the drive signal being a signal based on the temperature of the ink in the pressure chamber that is acquired from the temperature management section 450.

The humidity management section 250 derives information on the humidity of the detection target by using the capacitance of the humidity detection section 210 that is acquired from the capacitance measurement section 240 and a humidity calculation equation stored in the storage section 584 in advance. The humidity calculation equation indicates a correspondence relationship between the capacitance of the detection target and the humidity. Instead of the humidity calculation equation, a conversion table indicating a correspondence relationship between the capacitance of the detection target and the humidity may be used. In addition, the storage section 584 may store a correspondence relationship between the capacitance of the detection target and a temporal change in performance of the detection target.

The temperature management section 450 derives the temperature of the ink in the pressure chamber 12 by using the resistance value of the temperature detection resistor of the temperature detection section 410 that is acquired from the temperature-detection resistance measurement section 440 and a temperature calculation equation stored in the storage section 584 in advance. The temperature calculation equation indicates a correspondence relationship between the resistance value of the temperature detection resistor and the temperature. Instead of the temperature calculation equation, a conversion table indicating a correspondence relationship between the resistance value of the temperature detection resistor and the temperature may be used. The temperature management section 450 outputs the derived temperature of the ink in the pressure chamber 12 to the head control section 520.

Figure 3:
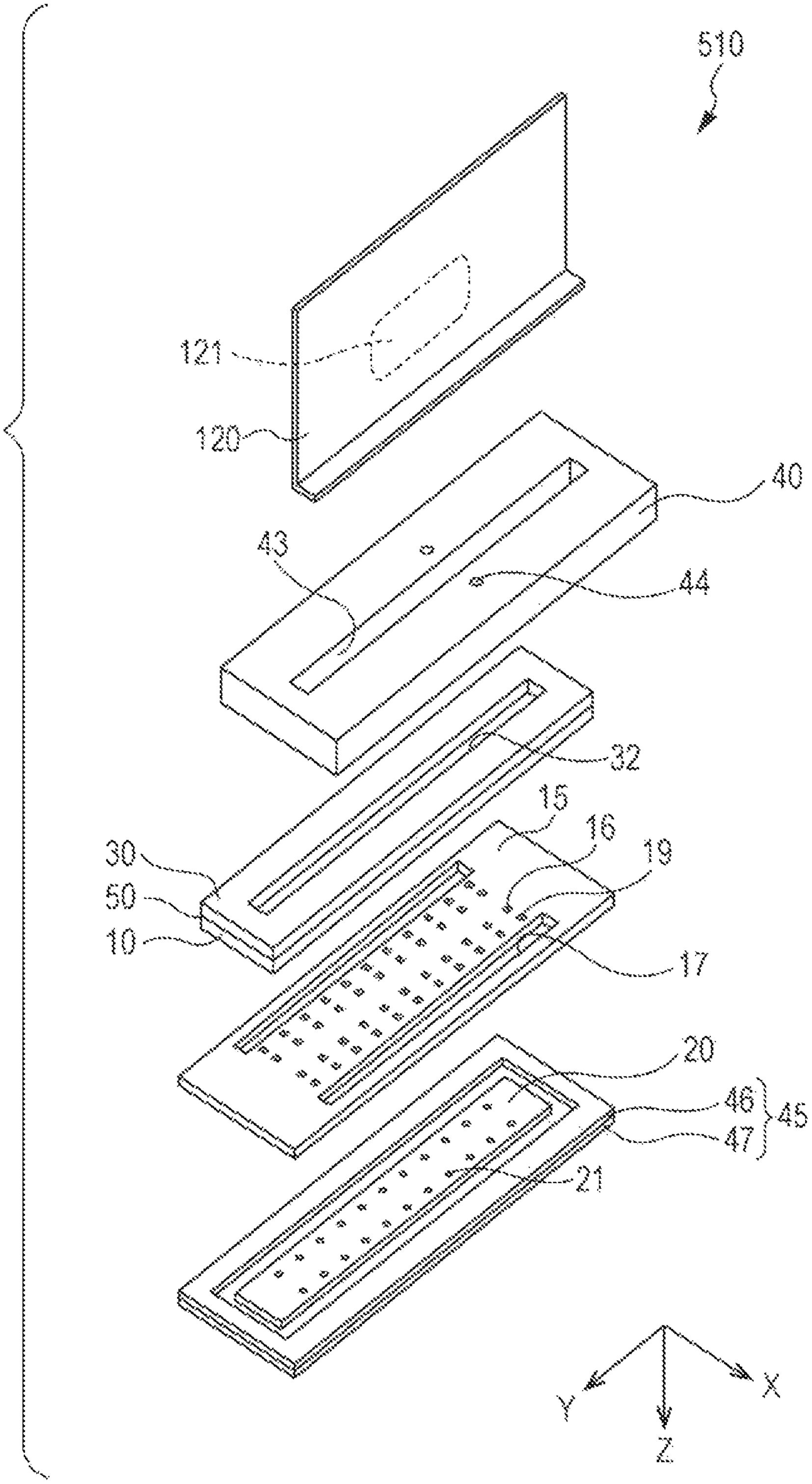
FIG. 3 is an exploded perspective view illustrating a configuration of a liquid ejecting head.
Figure 4:
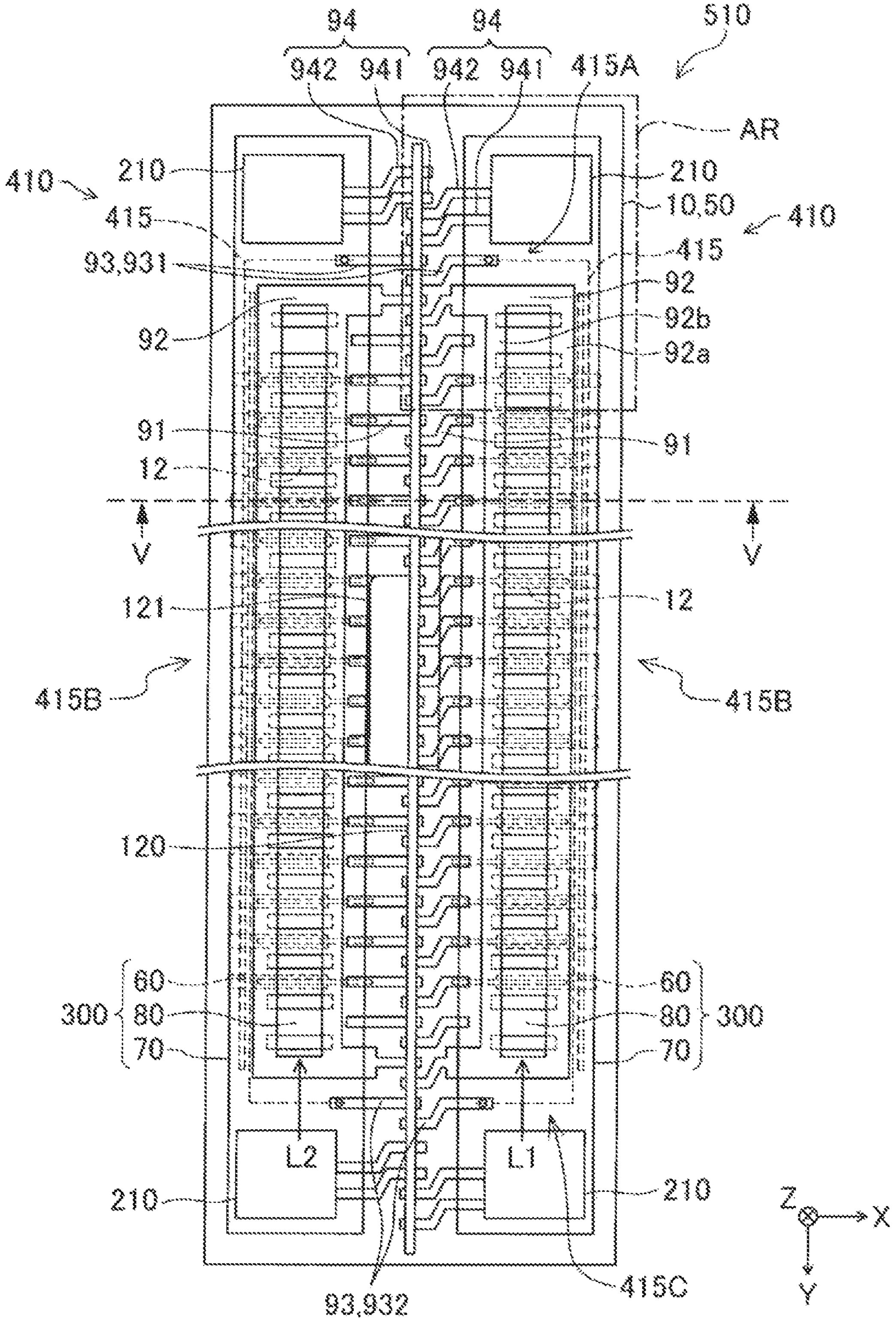
FIG. 4 is an explanatory diagram illustrating a configuration of the liquid ejecting head in plan view.
Figure 5:
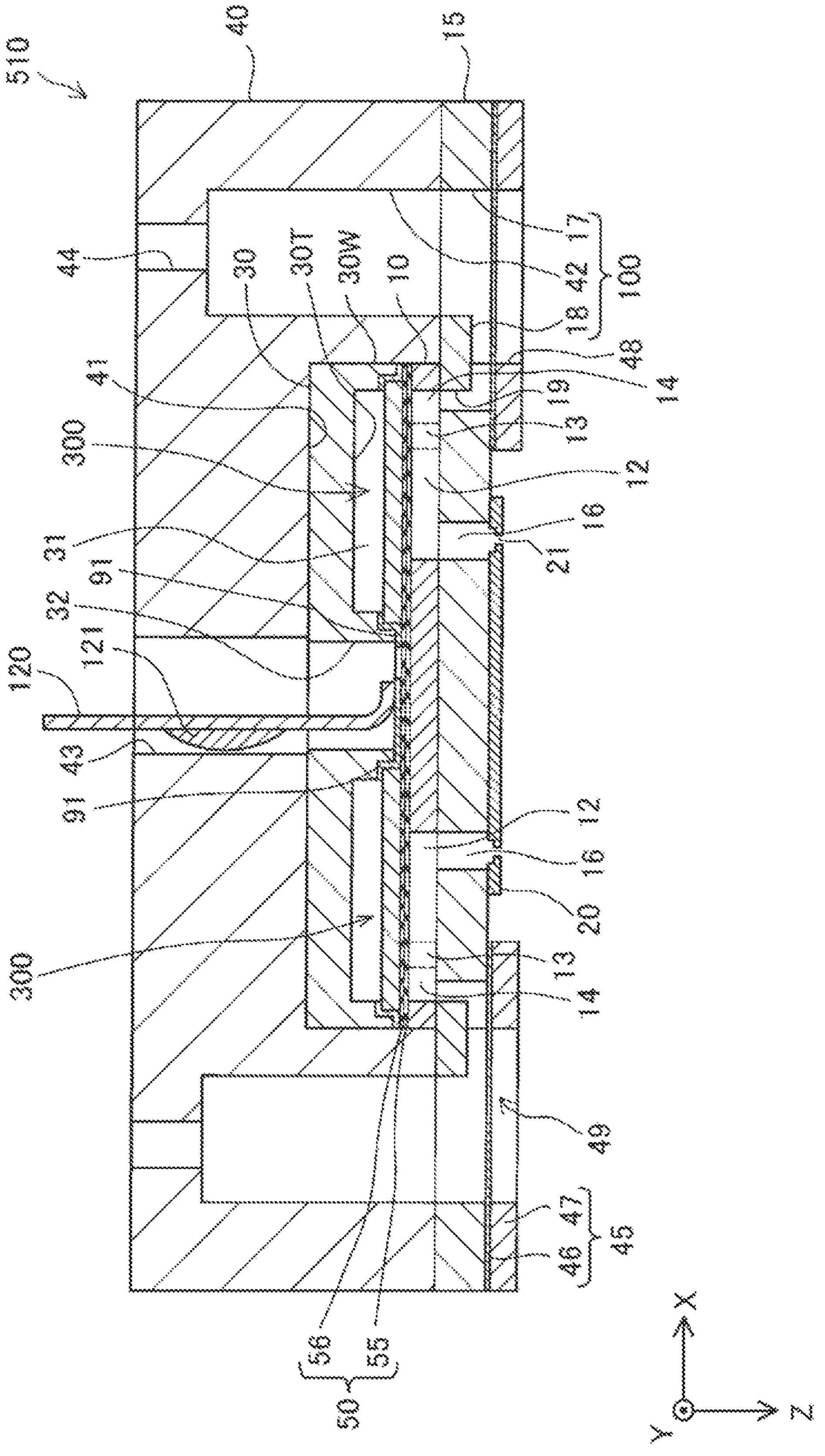
FIG. 5 is a cross-sectional view illustrating a V-V position of FIG. 4.

A detailed configuration of the liquid ejecting head 510 will be described with reference to FIG. 3 to FIG. 5. FIG. 3 is an exploded perspective view illustrating the configuration of the liquid ejecting head 510. FIG. 4 is an explanatory diagram illustrating the configuration of the liquid ejecting head 510 in plan view. In the present disclosure, the "plan view" means a state in which an object is viewed along a lamination direction to be described later. FIG. 4 illustrates the configuration around a pressure chamber substrate 10 and a vibration plate 50 in the liquid ejecting head 510. In order to facilitate understanding of the technique, a protective film 82, a sealing substrate 30, a case member 40, and the like are not illustrated. FIG. 5 is a cross-sectional view illustrating a V-V position of FIG. 4.

The liquid ejecting head 510 includes a pressure chamber substrate 10, a communication plate 15, a nozzle plate 20, a compliance substrate 45, a vibration plate 50, a sealing substrate 30, a case member 40, a wiring substrate 120, which are illustrated in FIG. 3, and a piezoelectric element 300 illustrated in FIG. 4. The liquid ejecting head 510 is configured by laminating these laminated members. In the present disclosure, a direction in which the laminated members of the liquid ejecting head 510 are laminated is also referred to as a "lamination direction". In the present embodiment, the lamination direction coincides with the Z-axis direction. In the present disclosure, the +Z direction side with respect to a predetermined reference position is also referred to as "one side of the lamination direction" or "lower side", and the −Z direction side with respect to a predetermined reference position is also referred to as "the other side of the lamination direction" or "upper side".

The pressure chamber substrate 10 is configured by using, for example, a silicon substrate, a glass substrate, an SOI substrate, various ceramic substrates, and the like. As illustrated in FIG. 4, a plurality of pressure chambers 12 are provided on the pressure chamber substrate 10. An ink flow path provided on the pressure chamber substrate 10, such as the pressure chamber 12, is formed by anisotropically etching the pressure chamber substrate 10 from the surface on the +Z direction side. The pressure chamber 12 is formed in a substantially rectangular shape in which a length in the X-axis direction is longer than a length in the Y-axis direction in plan view. On the other hand, the shape of the pressure chamber 12 is not limited to the rectangular shape, and may be a parallelogram shape, a polygonal shape, a circular shape, an oval shape, or the like. The oval shape means a shape in which both end portions in a longitudinal direction are semicircular based on a rectangular shape, and includes a rounded rectangular shape, an elliptical shape, an egg shape, and the like.

As illustrated in FIG. 4, a plurality of pressure chambers 12 are arranged along a predetermined direction in the pressure chamber substrate 10. In plan view of the liquid ejecting head 510 along the lamination direction, a direction in which the plurality of pressure chambers 12 are arranged is also referred to as an "arrangement direction". In the present embodiment, the plurality of pressure chambers 12 are arranged in two rows parallel to each other with the Y-axis direction as the arrangement direction. In the example of FIG. 4, the pressure chamber substrate 10 is provided with two pressure chamber rows, that is, a first pressure chamber row L1 having a first arrangement direction parallel to the Y-axis direction and a second pressure chamber row L2 having a second arrangement direction parallel to the Y-axis direction. The first pressure chamber row L1 and the second pressure chamber row L2 are disposed on both sides with the wiring substrate 120 interposed therebetween. Specifically, the second pressure chamber row L2 is disposed on the opposite side of the first pressure chamber row L1 with the wiring substrate 120 interposed therebetween in the direction that intersects with the arrangement direction of the first pressure chamber row L1. The direction orthogonal to both the arrangement direction and the lamination direction is also referred to as an "intersection direction". In the example of FIG. 4, the intersection direction is the X-axis direction, and the second pressure chamber row L2 is disposed in the −X direction with respect to the first pressure chamber row L1 with the wiring substrate 120 interposed between the first pressure chamber row L1 and the second pressure chamber row L2. In the plurality of pressure chambers 12, all the pressure chambers 12 do not necessarily have to be arranged in a straight line. For example, the plurality of pressure chambers 12 may be arranged along the Y-axis direction according to so-called staggered arrangement in which every other pressure chamber 12 is alternately disposed in the intersection direction.

As illustrated in FIG. 3, the communication plate 15, the nozzle plate 20, and the compliance substrate 45 are laminated on the +Z direction side of the pressure chamber substrate 10. The communication plate 15 is, for example, a flat plate member using a silicon substrate, a glass substrate, an SOI substrate, various ceramic substrates, a metal substrate, or the like. Examples of the metal substrate include a stainless steel substrate or the like. The communication plate 15 is provided with a nozzle communication path 16, a first manifold portion 17, a second manifold portion 18 illustrated in FIG. 5, and a supply communication path 19. Preferably, the communication plate 15 is formed by using a material having a thermal expansion coefficient substantially the same as a thermal expansion coefficient of the pressure chamber substrate 10. Thereby, when the temperatures of the pressure chamber substrate 10 and the communication plate 15 change, warpage of the pressure chamber substrate 10 and the communication plate 15 because of a difference in the thermal expansion coefficient can be suppressed.

As illustrated in FIG. 5, the nozzle communication path 16 is a flow path that communicates the pressure chamber 12 and a nozzle 21. The first manifold portion 17 and the second manifold portion 18 function as a part of a manifold 100 which is a common liquid chamber in which a plurality of pressure chambers 12 communicate with each other. The first manifold portion 17 is provided to penetrate the communication plate 15 in the Z-axis direction. Further, as illustrated in FIG. 5, the second manifold portion 18 is provided on a surface of the communication plate 15 on the +Z direction side without penetrating the communication plate 15 in the Z-axis direction.

As illustrated in FIG. 5, the supply communication path 19 is a flow path coupled to a pressure chamber supply path 14 provided on the pressure chamber substrate 10. The pressure chamber supply path 14 is a flow path coupled to one end portion of the pressure chamber 12 in the X-axis direction via a throttle portion 13. The throttle portion 13 is a flow path provided between the pressure chamber 12 and the pressure chamber supply path 14. The throttle portion 13 is a flow path in which an inner wall protrudes from the pressure chamber 12 and the pressure chamber supply path 14 and which is formed narrower than the pressure chamber 12 and the pressure chamber supply path 14. Thereby, the throttle portion 13 is set such that the flow path resistance is higher than those of the pressure chamber 12 and the pressure chamber supply path 14. With the configuration, even when pressure is applied to the pressure chamber 12 by the piezoelectric element 300 when the ink is ejected, the ink in the pressure chamber 12 can be suppressed or prevented from flowing back to the pressure chamber supply path 14. A plurality of supply communication paths 19 are arranged along the Y-axis direction, that is, the arrangement direction, and are individually provided for each of the pressure chambers 12. The supply communication path 19 and the pressure chamber supply path 14 communicate the second manifold portion 18 with each pressure chamber 12, and supply the ink in the manifold 100 to each pressure chamber 12.

The nozzle plate 20 is provided on a side opposite to the pressure chamber substrate 10, that is, on a surface of the communication plate 15 on the +Z direction side with the communication plate 15 interposed between the nozzle plate 20 and the pressure chamber substrate 10. A material of the nozzle plate 20 is not particularly limited, and for example, a silicon substrate, a glass substrate, an SOI substrate, various ceramic substrates, and a metal substrate can be used. Examples of the metal substrate include a stainless steel substrate or the like. As the material of the nozzle plate 20, an organic substance, such as a polyimide resin, can also be used. On the other hand, it is preferable to use a material for the nozzle plate 20 that has substantially the same thermal expansion coefficient as the thermal expansion coefficient of the communication plate 15. Thereby, when the temperatures of the nozzle plate 20 and the communication plate 15 change, warpage of the nozzle plate 20 and the communication plate 15 because of the difference in the thermal expansion coefficient can be suppressed.

A plurality of nozzles 21 are provided on the nozzle plate 20. Each nozzle 21 communicates with each pressure chamber 12 via the nozzle communication path 16. As illustrated in FIG. 3, the plurality of nozzles 21 are arranged along the arrangement direction of the pressure chambers 12, that is, the Y-axis direction. The nozzle plate 20 is provided with two nozzle rows in which the plurality of nozzles 21 are arranged in a row. The two nozzle rows respectively correspond to the first pressure chamber row L1 and the second pressure chamber row L2.

As illustrated in FIG. 5, the compliance substrate 45 is provided together with the nozzle plate 20 on the side opposite to the pressure chamber substrate 10 with the communication plate 15 interposed therebetween, that is, on a surface of the communication plate 15 on the +Z direction side. The compliance substrate 45 is provided on the periphery of the nozzle plate 20, and covers openings of the first manifold portion 17 and the second manifold portion 18 provided in the communication plate 15. The compliance substrate 45 includes, for example, a sealing film 46 made of a flexible thin film and a fixed substrate 47 made of a hard material such as a metal. As illustrated in FIG. 5, a region of the fixed substrate 47 facing the manifold 100 is completely removed in a thickness direction, and thus an opening portion 48 is defined. Therefore, one surface of the manifold 100 is a compliance portion 49 sealed only by the sealing film 46.

As illustrated in FIG. 5, the vibration plate 50 and the piezoelectric element 300 are laminated on a side opposite to the communication plate 15 or the like, that is, on a surface of the pressure chamber substrate 10 on the −Z direction side with the pressure chamber substrate 10 interposed therebetween. The piezoelectric element 300 bends and deforms the vibration plate 50 to cause a pressure change in the ink in the pressure chamber 12. In FIG. 5, illustration of the piezoelectric element 300 is simplified.

The vibration plate 50 is provided between the piezoelectric element 300 and the pressure chamber substrate 10. The vibration plate 50 is provided at a position closer to the pressure chamber substrate 10 side than the piezoelectric element 300, and includes an elastic film 55 containing silicon oxide ($SiO_2$) and an insulator film 56 that is provided on the elastic film 55 and contains a zirconium oxide film ($ZrO_2$). The elastic film 55 constitutes a surface of the flow path, such as the pressure chamber 12, on the −Z direction side. The vibration plate 50 may be configured with, for example, either the elastic film 55 or the insulator film 56, and may further include another film other than the elastic film 55 and the insulator film 56. Examples of the material of the other film include silicon, silicon nitride, and the like.

As illustrated in FIG. 3, the sealing substrate 30 having substantially the same size as the pressure chamber substrate 10 in plan view is further bonded to the surface of the pressure chamber substrate 10 on the −Z direction side by an adhesive or the like. The sealing substrate 30 may be bonded to a protective film 82 to be described later by an adhesive. As illustrated in FIG. 5, the sealing substrate 30 includes a ceiling portion 30T, a wall portion 30W, a holding portion 31, and a through hole 32. The holding portion 31 is a space defined by the ceiling portion 30T and the wall portion 30W, and protects an active portion of the piezoelectric element 300 by accommodating the piezoelectric element 300. In the present embodiment, the holding portions 31 are provided for each row of the piezoelectric elements 300. More specifically, two holding portions 31 corresponding to the first pressure chamber row L1 and the second pressure chamber row L2 are formed to be adjacent to each other. The through hole 32 penetrates the sealing substrate 30 along the Z-axis direction. The through hole 32 is disposed between the two holding portions 31 in plan view, and is formed in a long rectangular shape along the Y-axis direction.

As illustrated in FIG. 5, the case member 40 is fixed on the sealing substrate 30. The case member 40 forms the manifold 100 that communicates with the plurality of pressure chambers 12, together with the communication plate 15. The case member 40 has substantially the same outer shape as the communication plate 15 in plan view, and is bonded to cover the sealing substrate 30 and the communication plate 15.

The case member 40 includes an accommodation section 41, a supply port 44, a third manifold portion 42, and a coupling port 43. The accommodation section 41 is a space having a depth in which the pressure chamber substrate 10, the vibration plate 50, and the sealing substrate 30 can be accommodated. The third manifold portion 42 is a space provided in the vicinity of both ends of the accommodation section 41 in the X-axis direction in the case member 40. The manifold 100 is formed by coupling the third manifold portion 42 to the first manifold portion 17 and the second manifold portion 18 provided in the communication plate 15. The manifold 100 has a long shape in the Y-axis direction. The supply port 44 communicates with the manifold 100 to supply ink to each manifold 100. The coupling port 43 is a through hole that communicates with the through hole 32 of the sealing substrate 30, and the wiring substrate 120 is inserted to the coupling port 43.

In the liquid ejecting head 510, the ink supplied from the ink tank 550 illustrated in FIG. 1 is taken from the supply port 44 illustrated in FIG. 5, and an internal flow path from the manifold 100 to the nozzle 21 is filled with ink. Thereafter, a voltage based on the drive signal is applied to each of the piezoelectric elements 300 corresponding to the plurality of pressure chambers 12. Thereby, the vibration plate 50 bends and deforms together with the piezoelectric element 300, and thus the internal pressure of each pressure chamber 12 increases because of a change in volume of each pressure chamber 12. Therefore, ink droplets are ejected from each nozzle 21.

Figure 6:
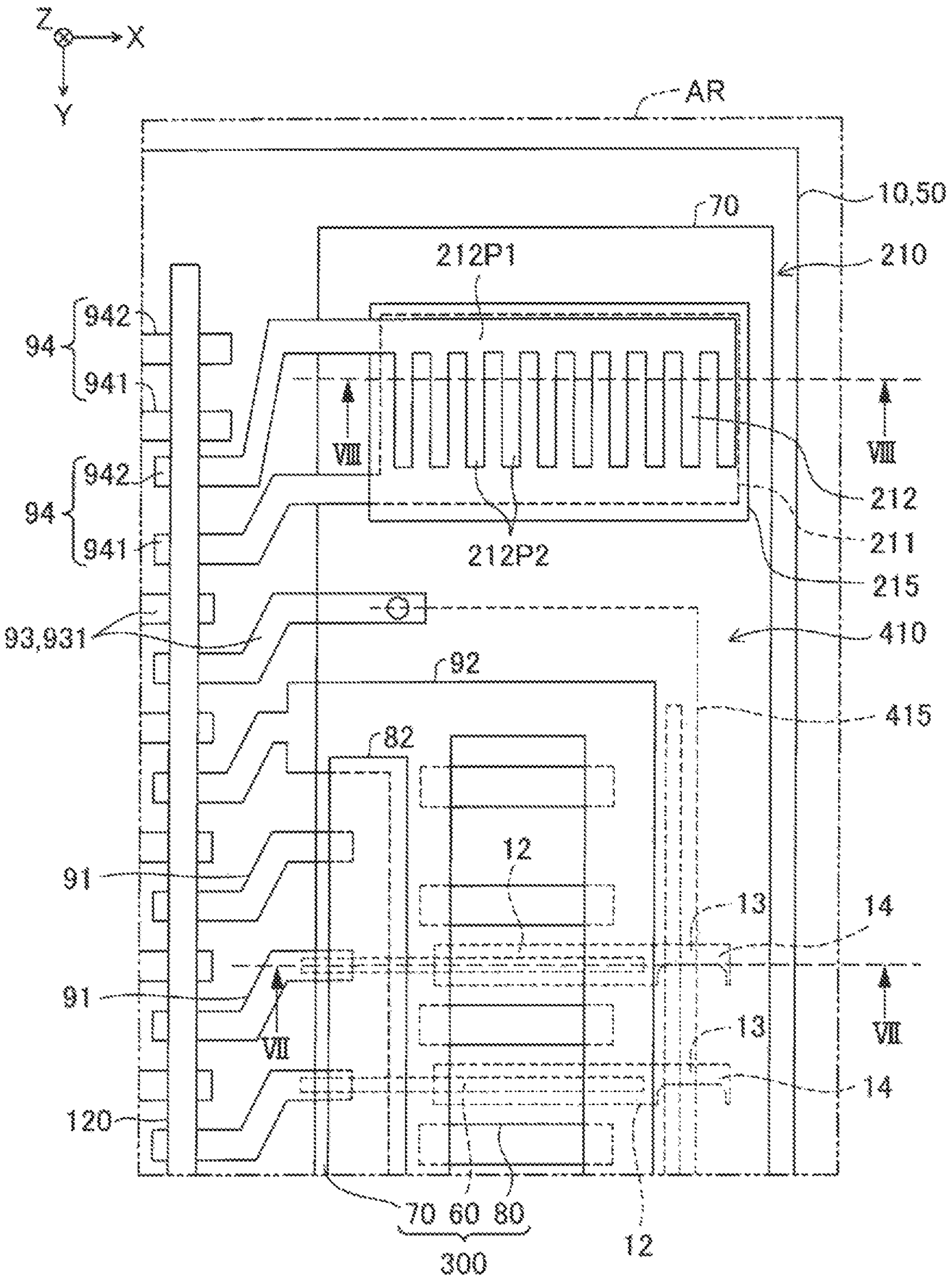
FIG. 6 is an enlarged explanatory diagram illustrating a partial range of FIG. 4.
Figure 7:
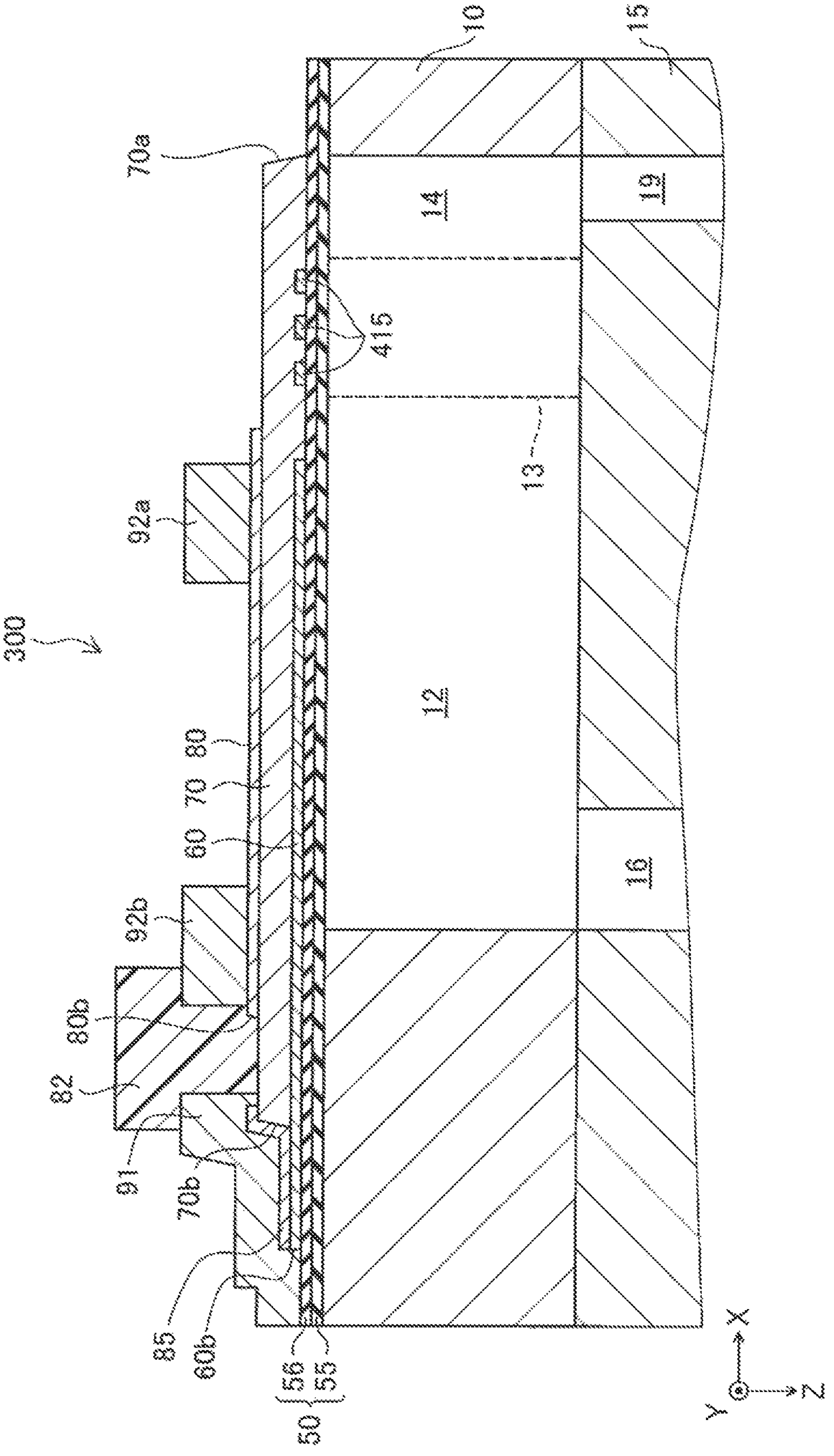
FIG. 7 is a cross-sectional view illustrating a VII-VII position of FIG. 6.

Configurations of the piezoelectric element 300, the humidity detection section 210, and the temperature detection section 410 will be described with reference to FIG. 6 to FIG. 8 as appropriate together with reference to FIG. 4 and FIG. 5. FIG. 6 is an enlarged explanatory diagram illustrating a partial range AR of FIG. 4. FIG. 7 is a cross-sectional view illustrating a VII-VII position of FIG. 6.

As illustrated in FIG. 7, the piezoelectric element 300 includes a first drive electrode 60, a piezoelectric body 70, and a second drive electrode 80. The first drive electrode 60, the piezoelectric body 70, and the second drive electrode 80 are laminated in this order in the −Z direction of the lamination direction. The piezoelectric body 70 is provided between the first drive electrode 60 and the second drive electrode 80 in the lamination direction.

As illustrated in FIG. 6, the first drive electrode 60 and the second drive electrode 80 are electrically coupled to the wiring substrate 120 illustrated in FIG. 5 via a first drive wiring 91 and a second drive wiring 92. The first drive electrode 60 and the second drive electrode 80 apply a drive voltage according to the drive signal to the piezoelectric body 70. The drive voltage is a voltage applied to the piezoelectric element 300 from the first drive electrode 60 and the second drive electrode 80 to drive the piezoelectric element 300 by the head control section 520. When a voltage is applied between the first drive electrode 60 and the second drive electrode 80, a part, at which piezoelectric distortion occurs in the piezoelectric body 70, in the piezoelectric element 300 is also referred to as an active portion.

A different drive voltage is applied to the first drive electrode 60 according to an ejection amount of ink, and a predetermined reference voltage is applied to the second drive electrode 80 regardless of the ejection amount of ink. When a voltage difference occurs between the first drive electrode 60 and the second drive electrode 80 because of the application of the drive voltage and the reference voltage, the piezoelectric body 70 of the piezoelectric element 300 is deformed. Because of the deformation of the piezoelectric body 70, the vibration plate 50 is deformed or vibrated, and thus the volume of the pressure chamber 12 changes. Because of the change in the volume of the pressure chamber 12, pressure is applied to the ink accommodated in the pressure chamber 12, and thus the ink is ejected from the nozzle 21 via the nozzle communication path 16.

In the present embodiment, the first drive electrode 60 is an individual electrode individually provided for the plurality of pressure chambers 12. As illustrated in FIG. 7, the first drive electrode 60 is a lower electrode provided on a side opposite to the second drive electrode 80 with the piezoelectric body 70 interposed therebetween, that is, on a lower side of the piezoelectric body 70. A thickness of the first drive electrode 60 is formed to be, for example, approximately 80 nanometers. For example, the first drive electrode 60 is formed of a conductive material including a metal, such as platinum (Pt), iridium (Ir), gold (Au), titanium (Ti), and a conductive metal oxide such as indium tin oxide abbreviated as ITO. The first drive electrode 60 may be formed by laminating a plurality of materials such as platinum (Pt), iridium (Ir), gold (Au), and titanium (Ti). In the present embodiment, platinum (Pt) is used for the first drive electrode 60.

As illustrated in FIG. 4, the piezoelectric body 70 has a predetermined width in the X-axis direction, and has a long rectangular shape along the arrangement direction of the pressure chambers 12, that is, the Y-axis direction. The thickness of the piezoelectric body 70 is formed, for example, from approximately 1000 nanometers to 4000 nanometers. Examples of the piezoelectric body 70 include a crystal film having a perovskite structure provided on the first drive electrode 60 and made of a ferroelectric ceramic material exhibiting an electromechanical conversion action, that is, a so-called perovskite type crystal. As the material of the piezoelectric body 70, for example, a ferroelectric piezoelectric material such as lead zirconate titanate (PZT) or a material to which a metal oxide, such as niobium oxide, nickel oxide, or magnesium oxide, is added can be used. Specifically, lead titanate ($PbTiO_3$), lead zirconate titanate ($Pb(Zr,Ti)O_3$), lead zirconate ($PbZrO_3$), lead lanthanum titanate ($(Pb,La),TiO_3$), lead lanthanum zirconate titanate ($(Pb,La)(Zr,Ti)O_3$), lead magnesium niobate zirconate ($Pb(Zr,Ti)(Mg,Nb)O_3$), or the like can be used. In the present embodiment, lead zirconate titanate (PZT) is used for the piezoelectric body 70.

The material of the piezoelectric body 70 is not limited to the lead-based piezoelectric material containing lead, and a non-lead-based piezoelectric material containing no lead can also be used. Examples of the non-lead-based piezoelectric material include bismuth iron acid (($BiFeO_3$), abbreviated to "BFO"), barium titanate (($BaTiO_3$), abbreviated to "BT"), potassium sodium niobate ((K,Na) ($NbO_3$), abbreviated to "KNN"), potassium sodium lithium niobate ((K,Na,Li) ($NbO_3$)), potassium sodium lithium tantalate niobate ($(K,Na,Li)(Nb,Ta)O_3$), bismuth potassium titanate (($(Bi_{1/2}K_{1/2})TiO_3$, abbreviated to "BKT"), bismuth sodium titanate (($(Bi_{1/2}Na_{1/2})TiO_3$, abbreviated to "BNT"), bismuth manganate ($BiMnO_3$, abbreviated to "BM"), a composite oxide containing bismuth, potassium, titanium, and iron and having a perovskite structure ($x[(Bi_xK_{1-x})TiO_3]-(1-x)[BiFeO_3]$, abbreviated to "BKT-BF"), a composite oxide containing bismuth, iron, barium, and titanium and having a perovskite structure ($(1-x)[BiFeO_3]-x[BaTiO_3]$, abbreviated to "BFO-BT"), and a material ($(1-x)[Bi(Fe_{1-y}M_y)O_3]-x[BaTiO_3]$, M being Mn, Co, or Cr), which is obtained by adding metals such as manganese, cobalt, and chromium to the composite oxide.

As illustrated in FIG. 4, the second drive electrode 80 is a common electrode that is commonly provided for the plurality of pressure chambers 12. The second drive electrode 80 has a predetermined width in the X-axis direction, and is provided to extend along the arrangement direction of the pressure chambers 12, that is, the Y-axis direction. As illustrated in FIG. 7, the second drive electrode 80 is an upper electrode provided on a side opposite to the first drive electrode 60 with the piezoelectric body 70 interposed therebetween, that is, on an upper side of the piezoelectric body 70. As a material of the second drive electrode 80, similar to the first drive electrode 60, for example, metals, such as platinum (Pt), iridium (Ir), gold (Au), and titanium (Ti), and conductive materials including conductive metal oxides, such as indium tin oxide abbreviated as ITO, are used. The second drive electrode 80 may be formed by laminating a plurality of materials such as platinum (Pt), iridium (Ir), gold (Au), and titanium (Ti). In the present embodiment, iridium (Ir) is used for the second drive electrode 80.

As illustrated in FIG. 7, a protective film 82 is provided on an end portion **80*b* of the second drive electrode 80 on the −X direction side. As a material of the protective film 82, a material having an electrical insulating property and a moisture barrier property is used. For the protective film 82, for example, an oxide insulating film such as aluminum oxide or hafnia, a polymer material film such as polyimide, or the like can be adopted. When the protective film 82 is a photosensitive resin such as polyimide, a resist layer used in a manufacturing process can be used. When the protective film 82 is made of a resin material, the surface resistance easily changes depending on the humidity, and thus the protective film 82 can be suitably used for an interlayer 215. In the present embodiment, polyimide is used for the protective film 82**.

As illustrated in FIG. 6, the protective film 82 is disposed at a drive electrode end portion position that overlaps the end portion of the second drive electrode 80 in plan view of the liquid ejecting head 510, and is formed to cover the end portion **80*b* of the second drive electrode 80 and the surface of the piezoelectric body 70, as illustrated in FIG. 7. By covering the surface of the piezoelectric body 70 with the protective film 82, the piezoelectric body 70 can be protected from moisture in the outside air and the air. Therefore, the protective film 82 is preferably made of a material having low water vapor permeability. Further, by covering the end portion 80*b* with the protective film 82, peeling of the second drive electrode 80 from the end portion 80*b* can be suppressed or prevented. Further, by covering the end portion 80*b*, driving of the piezoelectric element 300 in the vicinity of the end portion of the active portion of the piezoelectric element 300 can be suppressed. As a result, for example, occurrence of a physical damage such as a crack in a member in the vicinity of the end portion of the active portion, such as a joint portion between the vibration plate 50 and the pressure chamber substrate 10 and the vibration plate 50, can be suppressed. For this reason, the protective film 82 is preferably made of, for example, a material having a high elastic modulus or a high Young's modulus. For example, the Young's modulus is preferably equal to or higher than 2 GPa from a viewpoint of suitable driving suppression. Further, the protective film 82 has an insulating property, and thus a progress of migration between wirings such as wirings between the end portion 80*b* and the first drive wiring 91 or the like can be suppressed or prevented. When the second drive electrode 80 is disposed on the lower side of the piezoelectric body 70 as a lower electrode and the first drive electrode 60 is disposed on the upper side of the piezoelectric body 70 as an upper electrode, the drive electrode end portion position means a position overlapping the end portion of the first drive electrode 60 on the −X direction side. On the other hand, the drive electrode end portion position is not limited to only the end portion of the first drive electrode 60 on the −X direction side, and may be set by using an end portion of the first drive electrode 60 or an end portion of the second drive electrode 80 located in the X-axis direction and the Y-axis direction, or by using a plurality of end portions obtained by combining end portions of the first drive electrode 60 and the second drive electrode 80**.

As illustrated in FIG. 7, a wiring portion 85 is provided on the further −X direction side of the end portion **80*b* of the second drive electrode 80 in the −X direction. In FIG. 4 and FIG. 6, the wiring portion 85 is not illustrated. The wiring portion 85 is in the same layer as the second drive electrode 80, but is electrically discontinuous with the second drive electrode 80. The wiring portion 85 is formed from the end portion 70*b* of the piezoelectric body 70 in the −X direction to the end portion 60*b* of the first drive electrode 60 in the −X direction in a state of being spaced from the end portion 80*b* of the second drive electrode 80. The end portion 60*b* of the first drive electrode 60 in the −X direction is pulled out from the end portion 70*b* of the piezoelectric body 70 to the outside. The wiring portion 85 is provided for each piezoelectric element 300, and a plurality of wiring portions 85 are disposed at predetermined intervals along the Y-axis direction. Preferably, the wiring portion 85 is formed in the same layer as the second drive electrode 80. Thereby, a manufacturing process of the wiring portion 85 can be simplified and the cost can be reduced. Here, the wiring portion 85 may be formed in a layer different from the layer of the second drive electrode 80**.

As illustrated in FIG. 6 and FIG. 7, the first drive wiring 91 is electrically coupled to the first drive electrode 60 which is an individual electrode, and an extension portion 92*a* and an extension portion 92*b* of the second drive wiring 92 are electrically coupled to the second drive electrode 80 which is a common electrode. The first drive wiring 91 and the second drive wiring 92 function as drive wirings for applying a voltage for driving the piezoelectric body 70 from the wiring substrate 120.

The materials of the first drive wiring 91 and the second drive wiring 92 are conductive materials. For example, gold (Au), copper (Cu), titanium (Ti), tungsten (W), nickel (Ni), chromium (Cr), platinum (Pt), aluminum (Al), and the like can be used. In the present embodiment, gold (Au) is used for the first drive wiring 91 and the second drive wiring 92. The first drive wiring 91 and the second drive wiring 92 are formed in the same layer in a state of being electrically discontinuous with each other. Thereby, a process of forming the first drive wiring 91 can be shared with a process of forming the second drive wiring 92. Therefore, as compared with when the first drive wiring 91 and the second drive wiring 92 are individually formed, the manufacturing process can be simplified and productivity of the liquid ejecting head 510 can be improved. Here, the first drive wiring 91 and the second drive wiring 92 may be formed in different layers from each other. The first drive wiring 91 and the second drive wiring 92 may include an adhesion layer for improving adhesion to the first drive electrode 60, the second drive electrode 80, and the vibration plate 50.

The first drive wiring 91 is individually provided for each first drive electrode 60. As illustrated in FIG. 7, the first drive wiring 91 is coupled to the vicinity of the end portion 60*b* of the first drive electrode 60 via the wiring portion 85, and is pulled out in the −X direction to reach a top of the vibration plate 50. The first drive wiring 91 is electrically coupled to the end portion 60*b* of the first drive electrode 60 in the −X direction, the end portion 60*b* being pulled out from the end portion 70*b* of the piezoelectric body 70 to the outside. The wiring portion 85 may be omitted, and the first drive wiring 91 may be directly coupled to the end portion 60*b* of the first drive electrode 60.

As illustrated in FIG. 4, the second drive wiring 92 extends along the Y-axis direction, bends at both ends in the Y-axis direction, and is pulled out along the X-axis direction. The second drive wiring 92 includes an extension portion 92*a* extending along the Y-axis direction and an extension portion 92*b*. As illustrated in FIG. 4 and FIG. 5, the end portions of the first drive wiring 91 and the second drive wiring 92 are extended so as to be exposed to the through hole 32 of the sealing substrate 30, and are electrically coupled to the wiring substrate 120 in the through hole 32.

The wiring substrate 120 is configured with, for example, a flexible printed circuit (FPC). The wiring substrate 120 is provided with a plurality of wirings for coupling to the control device 580 and a power supply circuit (not illustrated). In addition, the wiring substrate 120 may be configured with any flexible substrate, such as flexible flat cable (FFC), instead of FPC. An integrated circuit 121 including a switching element and the like is mounted at the wiring substrate 120. A command signal or the like for driving the piezoelectric element 300 is input to the integrated circuit 121. The integrated circuit 121 controls a timing at which a drive signal for driving the piezoelectric element 300 is supplied to the first drive electrode 60 based on the command signal.

As illustrated in FIG. 6, the temperature detection section 410 includes a temperature detection resistor 415 and temperature detection wirings 93. The temperature detection resistor 415 is a resistance wiring used for detecting the temperature of the ink in the pressure chamber. The temperature detection wiring 93 electrically couples the wiring substrate 120 and the temperature detection resistor 415. More specifically, the temperature detection wirings 93 include a first temperature detection wiring 931 coupled to one end of the temperature detection resistor 415 and a second temperature detection wiring 932 coupled to the other end of the temperature detection resistor 415. The temperature detection wirings 93 are formed in the same layer as, for example, layers of the first drive wiring 91, the second drive wiring 92, and a humidity detection wiring 94 to be described later, and are formed so as to be electrically discontinuous with each other. An end portion of the temperature detection wiring 93 extends so as to be exposed to the through hole 32 of the sealing substrate 30, and is electrically coupled to the wiring substrate 120 in the through hole 32.

A material of the temperature detection resistor 415 is a material of which the resistance value is temperature dependent. For example, gold (Au), platinum (Pt), iridium (Ir), aluminum (Al), copper (Cu), titanium (Ti), tungsten (W), nickel (Ni), chromium (Cr), or the like can be used. Here, platinum (Pt) can be preferably used as a material of the temperature detection resistor 415 from a viewpoint that the change in resistance with temperature is large and stability and accuracy are high.

As illustrated in FIG. 7, the temperature detection resistor 415 is formed in the same layer as, for example, the layer of the first drive electrode 60 in the lamination direction, and is formed so as to be electrically discontinuous with the first drive electrode 60. In the present embodiment, the temperature detection resistor 415 is formed together with the first drive electrode 60 in a process of forming the first drive electrode 60. As a result, the temperature detection resistor 415 is formed of platinum (Pt), which is the same material as the first drive electrode 60, and a thickness of the temperature detection resistor 415 is approximately 80 nanometers similar to the first drive electrode 60. Here, the temperature detection resistor 415 is not limited thereto, may be individually formed separately from the process of forming the first drive electrode 60, or may be formed together with a conductor wiring different from the conductor wiring of the first drive electrode 60.

A material of the temperature detection wiring 93 is a conductive material. For example, gold (Au), copper (Cu), titanium (Ti), tungsten (W), nickel (Ni), chromium (Cr), platinum (Pt), aluminum (Al), and the like can be used. The material of the temperature detection wiring 93 is gold (Au) that is the same as the materials of the first drive wiring 91, the second drive wiring 92, and the humidity detection wiring 94 to be described later. Here, any material other than gold (Au) may be used for the temperature detection wiring 93, and the material may be different from the materials of the first drive wiring 91, the second drive wiring 92, and the humidity detection wiring 94.

As illustrated in FIG. 4, in the present embodiment, the temperature detection resistor 415 is continuously formed so as to surround the vicinities of the first pressure chamber row L1 and the second pressure chamber row L2 in plan view. More specifically, the temperature detection resistor 415 includes a first extension portion 415A electrically coupled to the first temperature detection wiring 931, a third extension portion 415C electrically coupled to the second temperature detection wiring 932, and second extension portions 415B between the first extension portion 415A and the third extension portion 415C.

The first extension portion 415A extends along the X-axis direction, which is the intersection direction, on one side in the arrangement direction of the plurality of pressure chambers 12, specifically, on the −Y direction side. The second extension portion 415B is further disposed on an outer side with respect to the first pressure chamber row L1 and the second pressure chamber row L2 in the liquid ejecting head 510, and extends along the Y-axis direction which is the arrangement direction. The third extension portion 415C extends along the X-axis direction, at a position on the other side in the arrangement direction of the plurality of pressure chambers 12, specifically, the +Y direction side. In this way, the temperature detection resistor 415 is disposed so as to surround the vicinities of the first pressure chamber row L1 and the second pressure chamber row L2. By widening a region in which the temperature detection resistor 415 is disposed, the temperature of the entire ink of the liquid ejecting head 510 can be detected.

As illustrated in FIG. 6 and FIG. 7, the temperature detection resistor 415 is disposed so as to pass the vicinity of the ink flow path in the pressure chamber substrate 10. In the present embodiment, the second extension portion 415B of the temperature detection resistor 415 is disposed so as to pass the throttle portion 13 in the vicinity of each pressure chamber 12. In addition, as illustrated in FIG. 4, the second extension portion 415B is formed as a so-called zigzag pattern to be reciprocated a plurality of times along the arrangement direction. By lengthening a wiring length of the portion of the temperature detection resistor 415 that passes the vicinity of the pressure chamber 12 and is likely to contribute to the temperature detection of the ink, accuracy in detection of the temperature of the ink in the pressure chamber 12 can be improved. Here, the second extension portion 415B may be formed in any shape, may be formed, for example, in a zigzag pattern to be reciprocated a plurality of times along the intersection direction instead of the arrangement direction, or may be formed, for example, in any shape such as a linear shape or a wave shape instead of the zigzag pattern. Further, the disposition position of the temperature detection resistor 415 is not limited to the position on the throttle portion 13, and may be any position on the pressure chamber 12. When the temperature detection resistor 415 cannot be disposed on the pressure chamber 12, the temperature detection resistor 415 may be disposed at a position close to the pressure chamber 12.

As illustrated in FIG. 4, in plan view, the humidity detection sections 210 are disposed at total four positions including positions adjacent to both sides of the first pressure chamber row L1 along the first arrangement direction and positions adjacent to both sides of the second pressure chamber row L2 along the second arrangement direction. The humidity detection sections 210 are individually provided for each of the holding portions 31 of the sealing substrate 30 corresponding to the first pressure chamber row L1 and the holding portion 31 of the sealing substrate 30 corresponding to the second pressure chamber row L2. Thereby, information on the humidity of each pressure chamber row can be acquired with high accuracy. Here, the positions of the humidity detection sections 210 are not limited to the four positions. The humidity detection sections 210 may be disposed at any one position of positions adjacent to the first pressure chamber row L1 on the +Y direction side and the −Y direction side and positions adjacent to the second pressure chamber row L2 on the +Y direction side and the −Y direction side in the second arrangement direction, and may be disposed in any positions obtained by combining a plurality of these positions. Here, preferably, the humidity detection sections 210 are formed in a number corresponding to the number of the holding portions 31.

As illustrated in FIG. 6, the humidity detection section 210 includes humidity detection wirings 94, a first detection electrode 211, a second detection electrode 212, and an interlayer 215. The humidity detection wirings 94 include a first humidity detection wiring 941 that electrically couples the wiring substrate 120 and the first detection electrode 211 and a second humidity detection wiring 942 that electrically couples the wiring substrate 120 and the second detection electrode 212. End portions of the first humidity detection wiring 941 and the second humidity detection wiring 942 extend so as to be exposed to the through hole 32 of the sealing substrate 30, and are electrically coupled to the wiring substrate 120 in the through hole 32.

The interlayer 215 is a humidity detection target, and functions as a so-called humidity-sensitive film. The interlayer 215 is formed of a material of which the capacitance changes with humidity. For the interlayer 215, among the members included in the liquid ejecting head 510, as a member of which the performance may deteriorate because of the influence of the humidity, a member to be laminated on at least one of the piezoelectric body 70, the vibration plate 50, or the pressure chamber substrate 10 can be adopted. In the present embodiment, the same material as the material of the protective film 82 is used for the interlayer 215. In the present embodiment, in the process of forming the protective film 82, the interlayer 215 is formed by using the same material as the material of the protective film 82 at the same time as the protective film 82, and thus the interlayer 215 is provided on the surface of the piezoelectric body 70. By sharing the process of forming the interlayer 215 with the process of forming the protective film 82, productivity of the liquid ejecting head 510 can be improved. In the present embodiment, the material of the interlayer 215 is not limited to the same material as the material of the protective film 82. For example, a material suitable as a humidity-sensitive film, such as a polymer material such as a cellulose compound, a polyvinyl compound, or an aromatic polymer, or a metal oxide such as aluminum oxide ($Al_2O_3$) or silicon oxide ($SiO_2$), may also be used.

A material of the humidity detection wiring 94 is a conductive material. For example, gold (Au), copper (Cu), titanium (Ti), tungsten (W), nickel (Ni), chromium (Cr), platinum (Pt), aluminum (Al), and the like can be used. The material of the humidity detection wiring 94 is gold (Au) that is the same as the materials of the first drive wiring 91, the second drive wiring 92, and the temperature detection wiring 93. Here, any material other than gold (Au) may be used for the humidity detection wiring 94, and the material may be different from the materials of the first drive wiring 91, the second drive wiring 92, and the temperature detection wiring 93.

Figure 8:
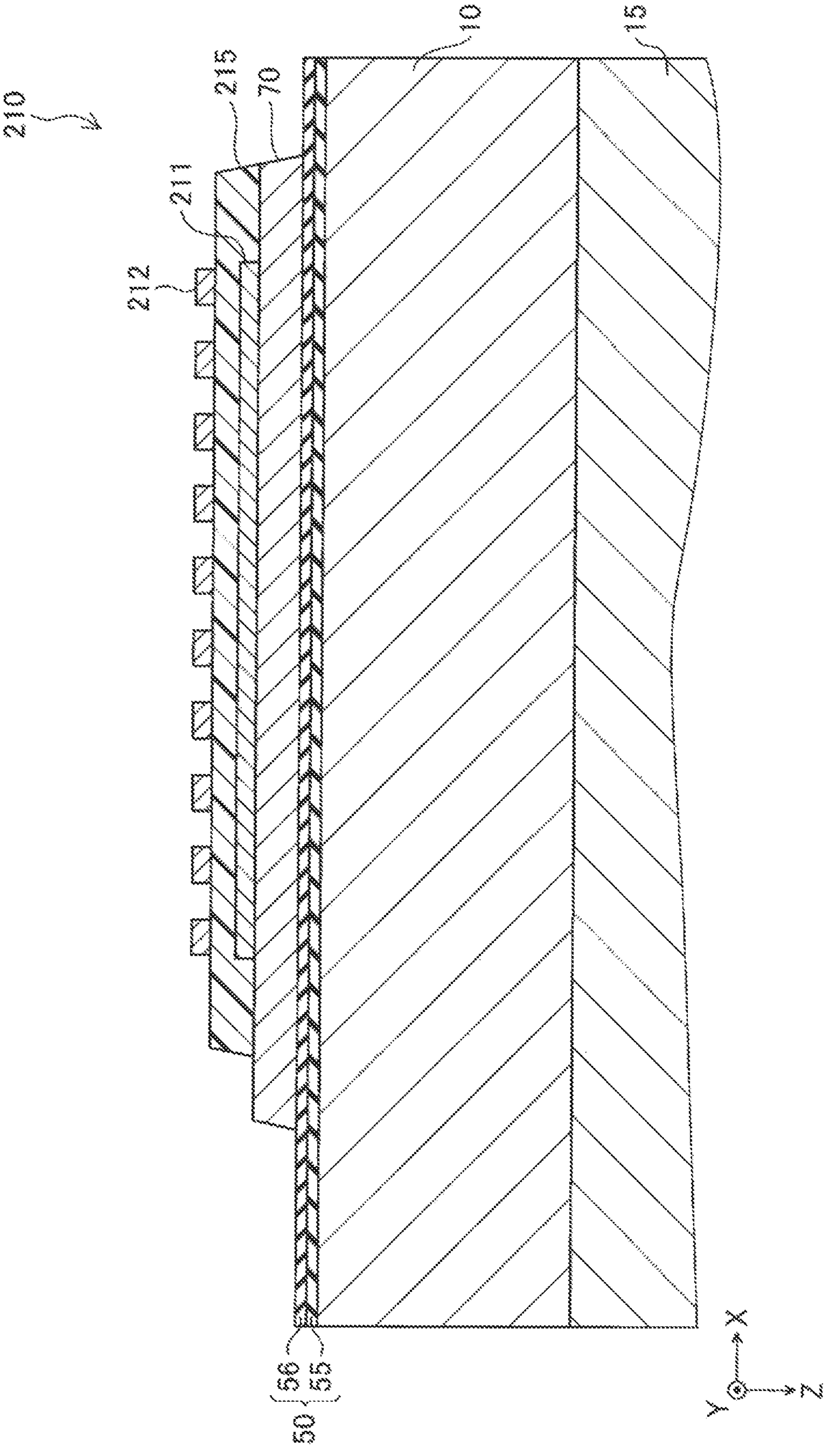
FIG. 8 is a cross-sectional view illustrating a VIII-VIII position of FIG. 6.

FIG. 8 is a cross-sectional view illustrating a VIII-VIII position of FIG. 6. As illustrated in FIG. 8, the first detection electrode 211 and the second detection electrode 212 are formed in different layers, and are electrically discontinuous with each other. The first detection electrode 211 and the second detection electrode 212 are both in contact with the interlayer 215, are disposed so as to face each other with the interlayer 215 interposed therebetween, and apply a voltage from the humidity-detection power supply section 230 to the interlayer 215. Specifically, the first detection electrode 211 is disposed on one side of the lamination direction, that is, on a lower side of the interlayer 215, and the second detection electrode 212 is disposed on the other side of the lamination direction, that is, on an upper side of the interlayer 215. With the configuration, the change in the capacitance between the first detection electrode 211 and the second detection electrode 212 can be detected, and a temporal change in the moisture absorption state of the protective film 82 which serves as the interlayer 215 can be managed. Thus, a temporal change in the performance of the protective film 82 because of humidity can be managed.

The first detection electrode 211 and the second detection electrode 212 can be formed in any shape. In the present embodiment, the first detection electrode 211 is formed in a flat plate shape. A so-called comb shape is adopted for the second detection electrode 212. More specifically, as illustrated in FIG. 6, the second detection electrode 212 includes a first electrode portion 212P1 extending along a certain first direction and a plurality of second electrode portions 212P2 coupled to the first electrode portion 212P1. The plurality of second electrode portions 212P2 extend along a second direction intersecting with the first direction, and are arranged to be separated from each other. In the example of FIG. 6, the first direction coincides with the X-axis direction, and the second direction coincides with the Y-axis direction.

Since the second detection electrode 212 is formed to cover the upper surface of the interlayer 215, an exposed area of the interlayer 215 is reduced. As a result, moisture absorption and dehumidification of the interlayer 215 may be inhibited, and detection accuracy may be lowered. From a viewpoint of suppressing inhibition of moisture absorption of the interlayer 215, preferably, the second detection electrode 212 is formed in a shape with an area smaller than an area of a flat plate shape, such as a through-hole shape or a comb shape, such that the upper surface of the interlayer 215 can be exposed.

The first detection electrode 211 and the second detection electrode 212 can be formed of any conductive material, and can be formed of, for example, a conductive material such as a metal, such as platinum (Pt), iridium (Ir), gold (Au), and titanium (Ti), or a conductive metal oxide such as indium tin oxide which is abbreviated as ITO. The first detection electrode 211 and the second detection electrode 212 may be made of the same material or different materials from each other. For the first detection electrode 211 and the second detection electrode 212, for example, copper (Cu), tungsten (W), nickel (Ni), chromium (Cr), aluminum (Al), or the like can also be used. The materials of the first detection electrode 211 and the second detection electrode 212 can be the same as the materials of the first drive wiring 91, the second drive wiring 92, the temperature detection wiring 93, and the humidity detection wiring 94.

In the present embodiment, for example, the process of forming the first detection electrode 211 is shared with the process of forming the second drive electrode 80, and the first detection electrode 211 is provided on the piezoelectric body 70. Therefore, the material of the first detection electrode 211 is the same iridium (Ir) as the material of the second drive electrode 80. By sharing the process of forming the first detection electrode 211 with the process of forming the second drive electrode 80, productivity of the liquid ejecting head 510 can be improved. The process of forming the first detection electrode 211 may be shared with the process of forming the first drive electrode 60.

In the present embodiment, the process of forming the second detection electrode 212 is shared with the process of forming the first drive wiring 91, the second drive wiring 92, the temperature detection wiring 93, or the humidity detection wiring 94, and the second detection electrode **212*a*2 is provided on the interlayer 215. Therefore, the material of the second detection electrode 212 is the same gold (Au) as the material of the first drive wiring 91 or the like. By sharing the process of forming the second detection electrode 212 with the process of forming the first drive wiring 91 and the like, productivity of the liquid ejecting head 510 can be improved. As an example of a specific process order, after the piezoelectric body 70 is coated, the first detection electrode 211 is formed in the same process as the process of forming the second drive electrode 80, and then the interlayer 215 is formed using the same material as the material of the protective film 82. Thereafter, the second detection electrode 212, the first drive wiring 91, the second drive wiring 92, the temperature detection wiring 93, and the humidity detection wiring 94 are formed in the same process, and then the protective film 82 is formed at the drive electrode end portion position. The process of forming the second detection electrode 212 may be shared with the process of forming the first drive electrode 60 or the second drive electrode 80**.

As described above, the liquid ejecting head 510 of the present embodiment includes the interlayer 215 which is laminated on the piezoelectric body 70 and of which the capacitance changes according to humidity, the first detection electrode 211 which is in contact with the interlayer 215, and the second detection electrode 212 which is in contact with the interlayer 215, the second detection electrode 212 being disposed on the opposite side of the first detection electrode 211 with the interlayer 215 interposed therebetween. With the liquid ejecting head 510 configured as described above, by using the capacitance between the first detection electrode 211 and the second detection electrode 212, the information on the humidity of the interlayer 215, which is laminated on the piezoelectric body 70 among the component members of the liquid ejecting head 510, can be detected with high accuracy. Therefore, the influence of the humidity on the piezoelectric element 300 or the member in the vicinity of the piezoelectric element 300 can be appropriately managed.

The liquid ejecting apparatus 500 of the present embodiment includes, in addition to the liquid ejecting head 510, a capacitance measurement section 240 that measures capacitance between the first detection electrode 211 and the second detection electrode 212, and a humidity management section 250 that acquires information on humidity of the interlayer 215 by using the capacitance measured by the capacitance measurement section 240. Therefore, the liquid ejecting apparatus 500 that can appropriately manage the information on the humidity in the member in the liquid ejecting head 510 can be provided.

With the liquid ejecting head 510 of the present embodiment, the first detection electrode 211 is formed of the same material as the material of the second drive electrode 80. The process of forming the first detection electrode 211 can be shared with the process of forming the second drive electrode 80, and thus productivity of the liquid ejecting head 510 can be improved.

The liquid ejecting head 510 of the present embodiment further includes the protective film 82 that is disposed on an upper side of the pressure chamber substrate 10, more specifically, at the end portion **80*b* of the second drive electrode 80 and on the surface of the piezoelectric body 70, and is formed using a resin material. The interlayer 215 is formed of the same material as the material of the protective film 82. By forming the interlayer 215 using a resin material of which the capacitance is likely to change according to humidity, accuracy of detection of the information on humidity can be improved. Further, by sharing the process of forming the interlayer 215 with the process of forming the protective film 82, productivity of the liquid ejecting head 510** can be improved.

With the liquid ejecting head 510 of the present embodiment, the first detection electrode 211 is disposed on the lower side of the interlayer 215, and the second detection electrode 212 is disposed on the upper side of the interlayer 215. As compared with when the first detection electrode 211 and the second detection electrode 212 are formed in the same layer on the upper side or the lower side of the interlayer 215, the capacitance of the interlayer 215 can be detected with high accuracy.

With the liquid ejecting head 510 of the present embodiment, the second detection electrode 212 includes the first electrode portion 212P1 extending along the first direction on the surface of the interlayer 215 and the plurality of second electrode portions 212P2 coupled to the first electrode portion 212P1 on the surface of the interlayer 215. The second electrode portions 212P2 extend in the second direction intersecting with the first direction and are arranged to be separated from each other. By forming the second detection electrode 212 in a comb shape with an area smaller than an area in a flat plate shape, an exposed area on the upper surface of the interlayer 215 can be increased, and thus inhibition of moisture absorption and dehumidification of the interlayer 215 by the second detection electrode 212 can be suppressed or prevented.

With the liquid ejecting head 510 of the present embodiment, in plan view, the humidity detection sections 210 are disposed at positions adjacent to both sides of the first pressure chamber row L1 along the first arrangement direction and positions adjacent to both sides of the second pressure chamber row L2 along the second arrangement direction. With the liquid ejecting head 510 configured as described above, by individually providing the humidity detection sections 210 for each of the holding portions 31 of the first pressure chamber row L1 and the second pressure chamber row L2, the information on humidity for each pressure chamber row can be acquired with high accuracy.

A2. Another Embodiment 1

Figure 9:
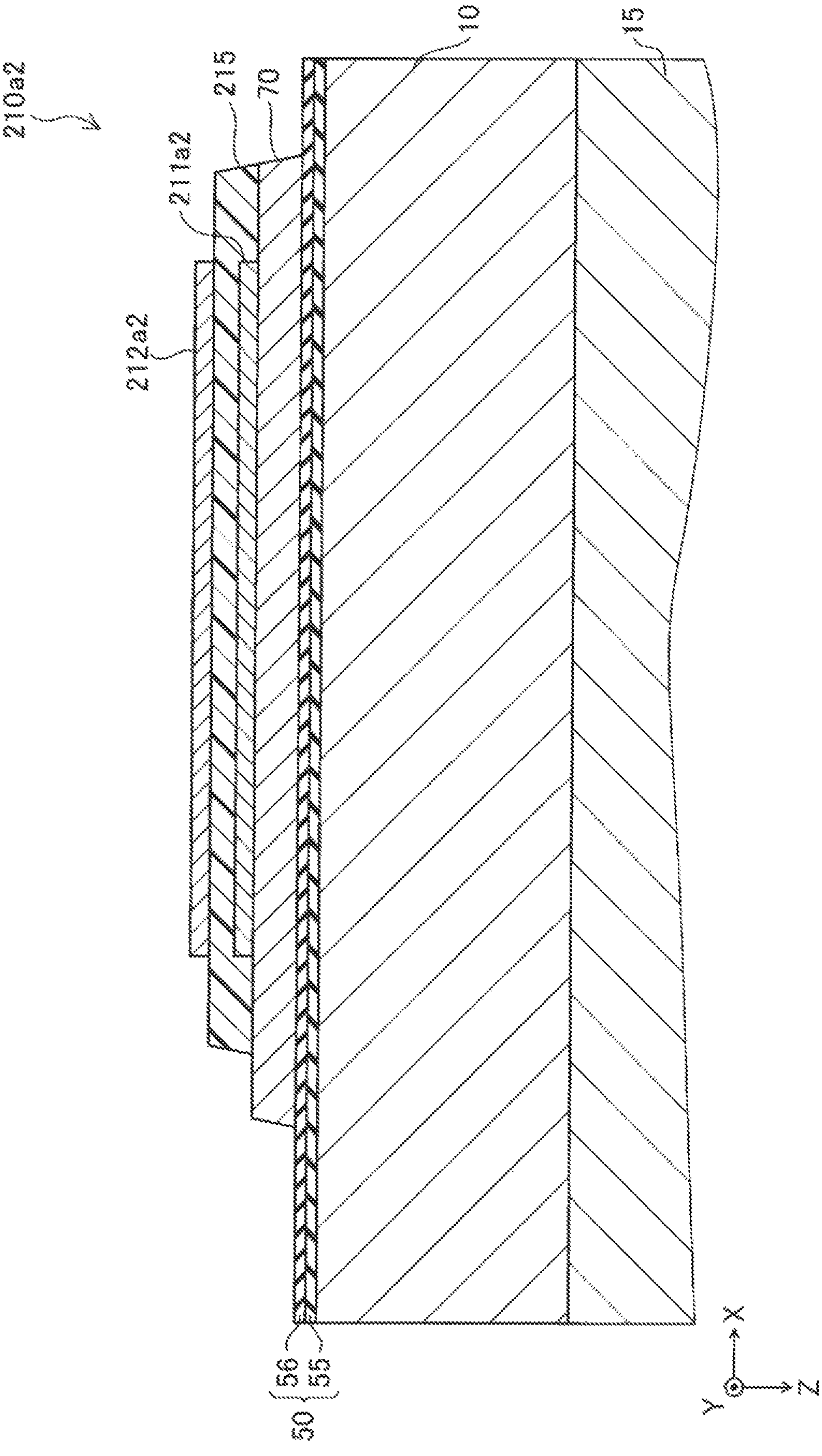
FIG. 9 is an explanatory diagram illustrating a humidity detection section included in a liquid ejecting head according to another embodiment.

FIG. 9 is an explanatory diagram illustrating the humidity detection section 210*a*2 included in the liquid ejecting head of another embodiment. The first embodiment describes an example in which the second detection electrode 212 has a comb shape. On the other hand, various shapes can be adopted for the first detection electrode and the second detection electrode. In the example of FIG. 9, both the first detection electrode 211*a*2 and the second detection electrode 212*a*2 are formed in a flat plate shape. In addition to the flat plate shape, the second detection electrode 212*a*2 may have, for example, a shape in which a certain number of through holes having a certain shape are provided in a comb shape. In addition to the comb shape, a so-called zigzag shape in which the conductor zigzags may be adopted. Further, although not illustrated, the first detection electrode 211*a*2 may have a comb shape similar to the shape of the second detection electrode 212*a*2. For example, the first detection electrode 211*a*2 may have a shape in which a certain number of through holes having a certain shape are provided in a comb shape. In addition to the comb shape, a zigzag shape in which the conductor zigzags may be adopted.

B1. Second Embodiment

Figure 10:
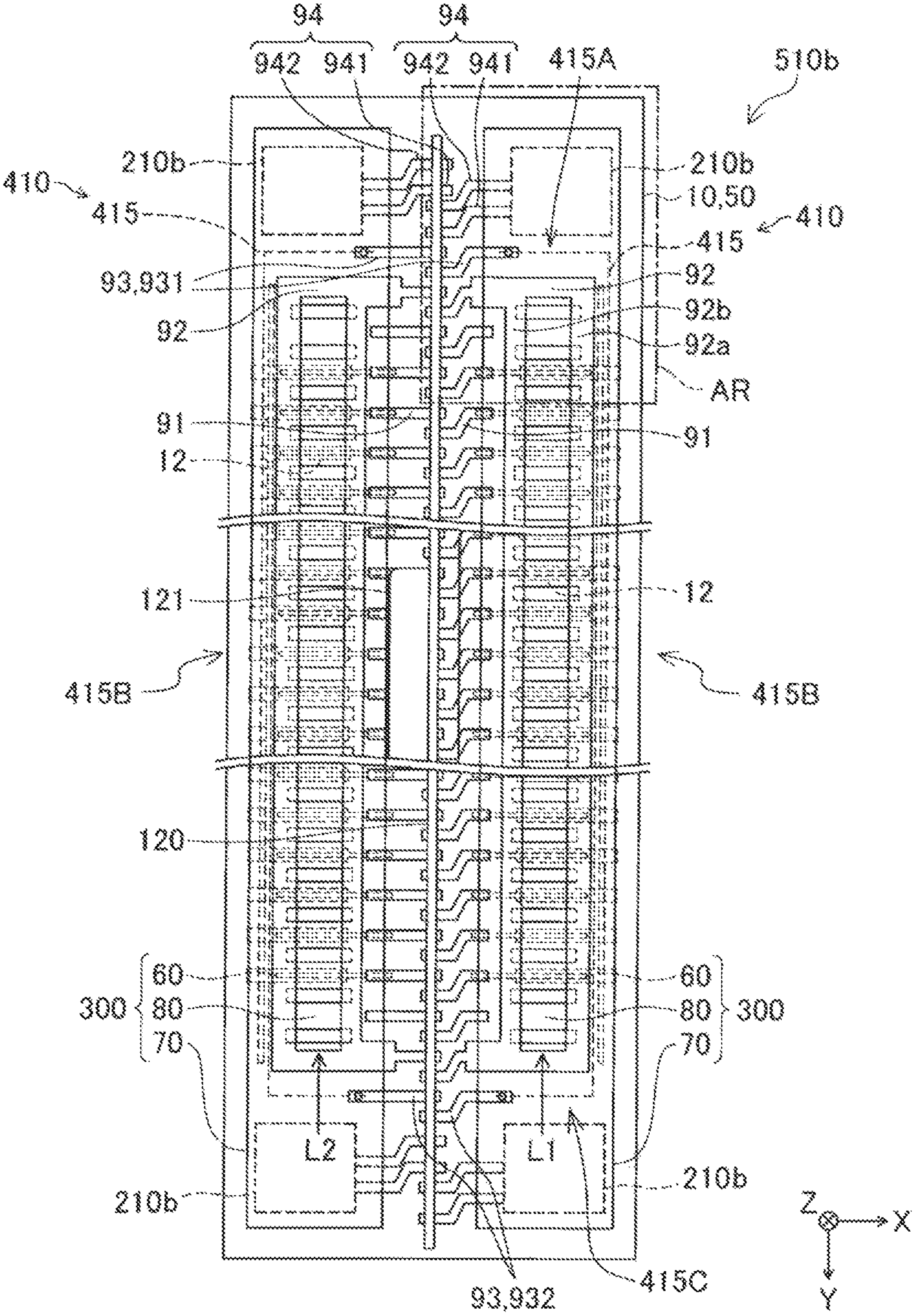
FIG. 10 is an explanatory diagram illustrating a configuration of a liquid ejecting head according to a second embodiment in plan view.

FIG. 10 is an explanatory diagram illustrating a configuration of a liquid ejecting head 510*b* according to a second embodiment of the present disclosure in plan view. The liquid ejecting head 510*b* of the present embodiment is different in that a humidity detection section 210*b* is provided instead of the humidity detection section 210, and the other configurations are the same as the configurations of the liquid ejecting head 510 of the first embodiment.

Figure 11:
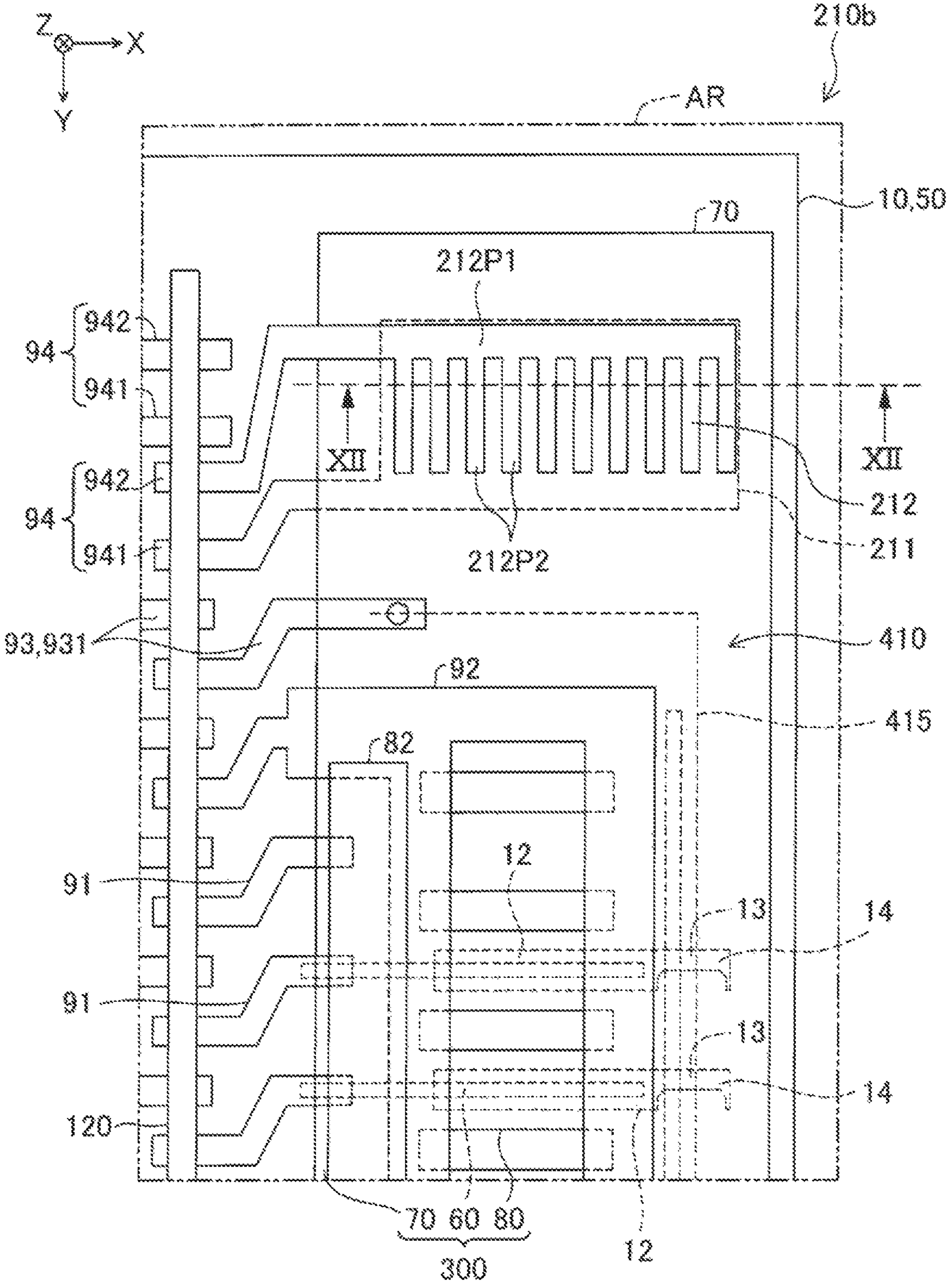
FIG. 11 is an enlarged explanatory diagram illustrating a partial range of FIG. 10.

FIG. 11 is an enlarged explanatory diagram illustrating a partial range AR of FIG. 10. The humidity detection section 210*b* is different from the humidity detection section 210 described in the first embodiment in that the material used for the interlayer is different. More specifically, in the first embodiment, the same material as the material of the protective film 82 is used for the interlayer 215. On the other hand, the present embodiment is different from the first embodiment in that the same material as the material of the piezoelectric body 70 is used for the interlayer 215*b*. As illustrated in FIG. 11, the disposition position of the humidity detection section 210*b* and the shapes of the first detection electrode 211*b* and the second detection electrode 212*b* in plan view are the same as those in the first embodiment.

Figure 12:
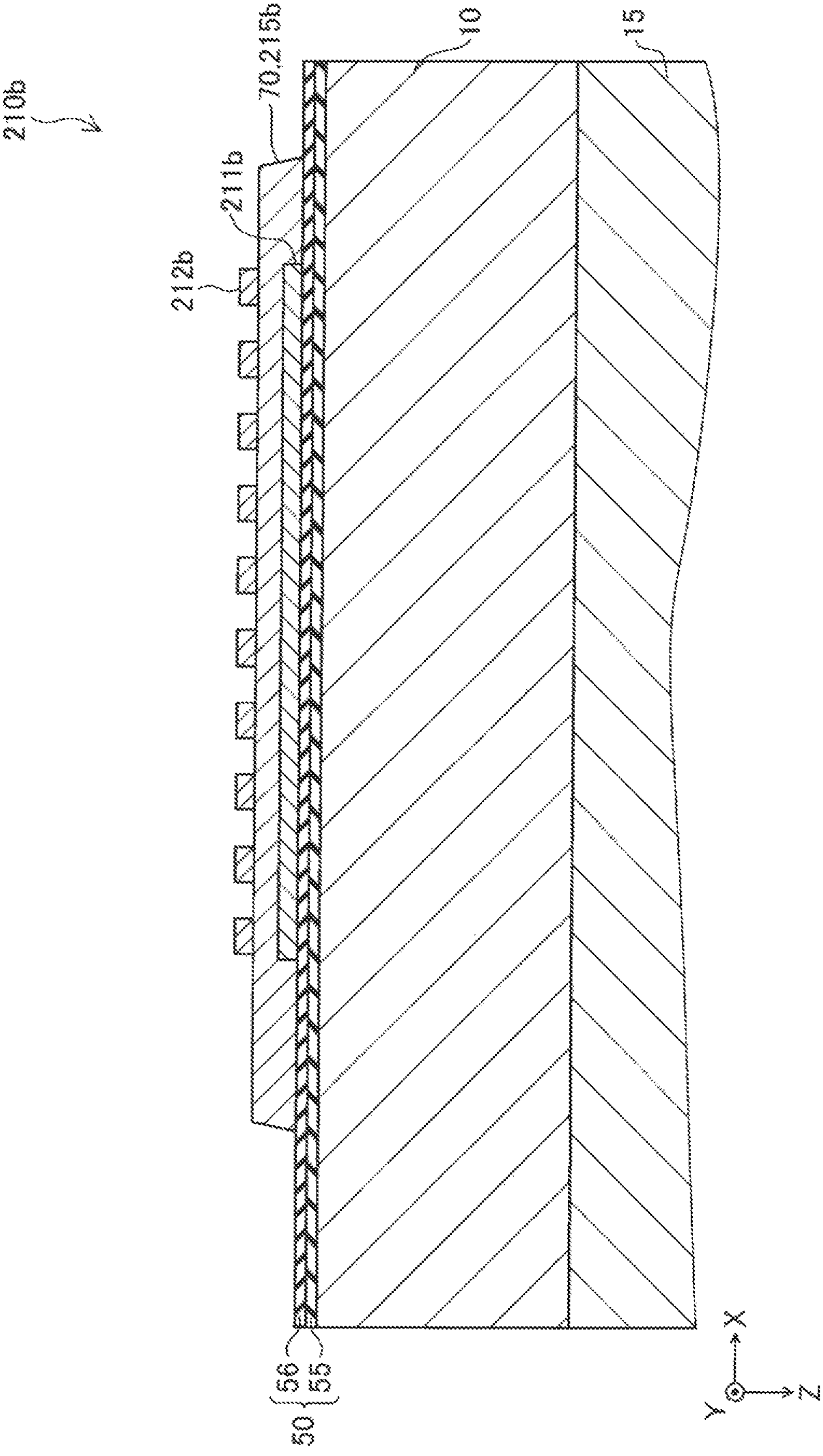
FIG. 12 is a cross-sectional view illustrating an XII-XII position of FIG. 11.

FIG. 12 is a cross-sectional view illustrating an XII-XII position of FIG. 11. As illustrated in FIG. 12, the first detection electrode 211*b*2 has a flat plate shape, and is disposed on the lower side of the piezoelectric body 70 which serves as the interlayer 215. More specifically, the first detection electrode 211*b* is provided on the vibration plate 50, and is disposed between the vibration plate 50 and the piezoelectric body 70. By disposing the first detection electrode 211*b* on the lower side of the piezoelectric body 70, the process of forming the first detection electrode 211*b* can be easily shared with the process of forming the first drive electrode 60. In the present embodiment, the first detection electrode 211*b* is formed together with the first drive electrode 60 in the process of forming the first drive electrode 60, and the first detection electrode 211*b* and the first drive electrode 60 are formed of the same material.

The second detection electrode 212*b*2 has the same comb shape as the shape of the second detection electrode 212 described in the first embodiment, and is exposed and disposed on the upper side of the piezoelectric body 70. By disposing the second detection electrode 212*b*2 on the upper side of the piezoelectric body 70, the process of forming the second detection electrode 212*b*2 can be shared with the process of forming the second drive electrode 80 after the piezoelectric body 70 is coated. From a viewpoint of suppressing inhibition of moisture absorption and dehumidification of the piezoelectric body 70 which serves as the interlayer 215*b*, preferably, the second detection electrode 212*b*2 is formed in a shape with an area smaller than an area of a flat plate shape, such as a comb shape, such that the upper surface of the piezoelectric body 70 is exposed. Further, in the present embodiment, the second detection electrode 212*b* is formed together with the second drive electrode 80 in the process of forming the second drive electrode 80. Therefore, the second detection electrode 212*b* and the second drive electrode 80 are formed of the same material.

Figure 13:
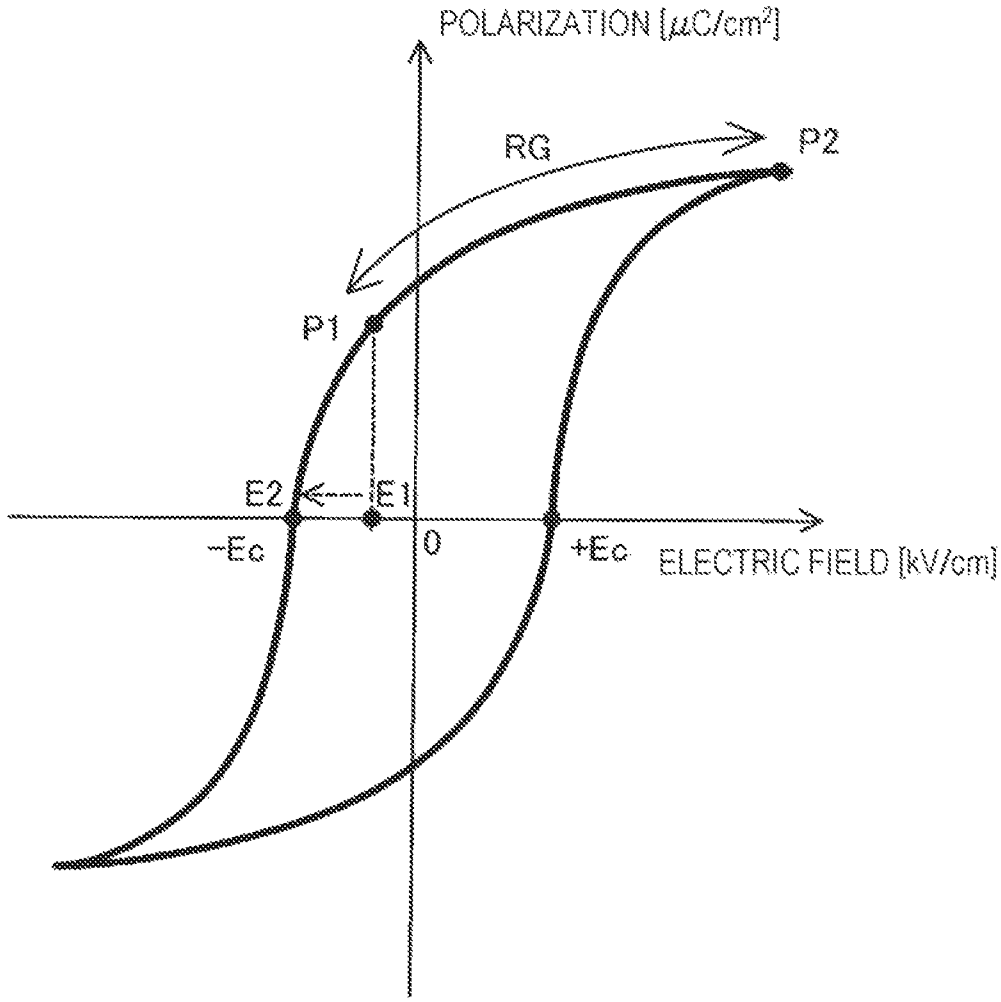
FIG. 13 is an explanatory diagram illustrating an example of a characteristic hysteresis loop of a piezoelectric body.

FIG. 13 is an explanatory diagram illustrating an example of a hysteresis loop which is a characteristic of the piezoelectric body 70. As illustrated in FIG. 13, when the electric field applied to the piezoelectric body 70 increases, the polarization becomes zero, and the positive and negative of the polarization are reversed. A magnitude of the electric field when the polarization is reversed is also called a "coercive electric field". FIG. 13 illustrates a positive coercive electric field +Ec and a negative coercive electric field −Ec. In the present embodiment, the head control section 520 applies a drive voltage to the piezoelectric body 70, the drive voltage being adjusted to be in, for example, a range RG in which the polarization is equal to or higher than a first polarization value P1 and is equal to or lower than a second polarization value P2.

The humidity management section 250 applies a detection voltage to the first detection electrode 211*b* and the second detection electrode 212*b*, the detection voltage being a voltage for generating a second electric field E2 closer to the negative coercive electric field −Ec of the piezoelectric body 70 than a first electric field E1 which is the minimum electric field in the range RG of the electric fields generated in the piezoelectric element 300 by the drive voltage. Since the electric field is proportional to an amount of charge, capacitance can be obtained by differentiating the electric field. As the capacitance increases, a current flowing through the piezoelectric body 70 greatly changes with respect to the applied voltage. Therefore, by using, as the detection voltage, a voltage for generating the second electric field E2 in the vicinity of the negative coercive electric field −Ec at which the capacitance is substantially maximum, a change in the current value when the detection voltage is applied can be increased, and thus sensitivity of humidity measurement can be improved.

As described above, the liquid ejecting head 510*b* of the second embodiment includes the piezoelectric body 70 which is laminated on the vibration plate 50, of which the capacitance changes according to humidity, and which serves as the interlayer 215*b*. With the liquid ejecting head 510*b* configured as described above, the information on humidity of the piezoelectric body 70 can be detected with high accuracy, and thus an influence of the humidity on the piezoelectric element 300 can be appropriately managed.

With the liquid ejecting head 510*b* of the present embodiment, the first detection electrode 211*b* is formed of the same material as the material of the first drive electrode 60. With the configuration, the process of forming the first detection electrode 211*b* can be shared with the process of forming the first drive electrode 60, and thus productivity of the liquid ejecting head 510*b* can be improved.

With the liquid ejecting head 510*b* of the present embodiment, the first detection electrode 211*b* is disposed on the lower side of the piezoelectric body 70 which serves as the interlayer 215*b*, and the second detection electrode 212*b* is disposed on the upper side of the piezoelectric body 70. As compared with when the first detection electrode 211 and the second detection electrode 212 are formed in the same layer, the capacitance of the piezoelectric body 70 can be detected with high accuracy.

The liquid ejecting head 510*b* of the present embodiment includes a capacitance measurement section 240 that measures capacitance between the first detection electrode 211*b* and the second detection electrode 212*b*, and a humidity management section 250 that acquires information on humidity of the interlayer 215*b* by using the capacitance measured by the capacitance measurement section 240. Therefore, the liquid ejecting apparatus 500 that can appropriately manage the information on the humidity of the piezoelectric body 70 can be provided.

With the liquid ejecting head 510*b* of the present embodiment, the humidity management section 250 applies a detection voltage to the first detection electrode 211*b* and the second detection electrode 212*b*, the detection voltage being a voltage for generating a second electric field E2 closer to the negative coercive electric field −Ec of the piezoelectric body 70 than a first electric field E1 generated in the piezoelectric body 70 by the drive voltage applied to the piezoelectric body 70 from the first drive electrode 60 and the second drive electrode 80 to drive the piezoelectric element 300. By using the detection voltage for generating the second electric field E2 in the vicinity of the negative coercive electric field −Ec at which the capacitance is substantially maximum, a change in the current value when the detection voltage is applied can be increased, and thus sensitivity of humidity measurement can be improved.

Figure 14:
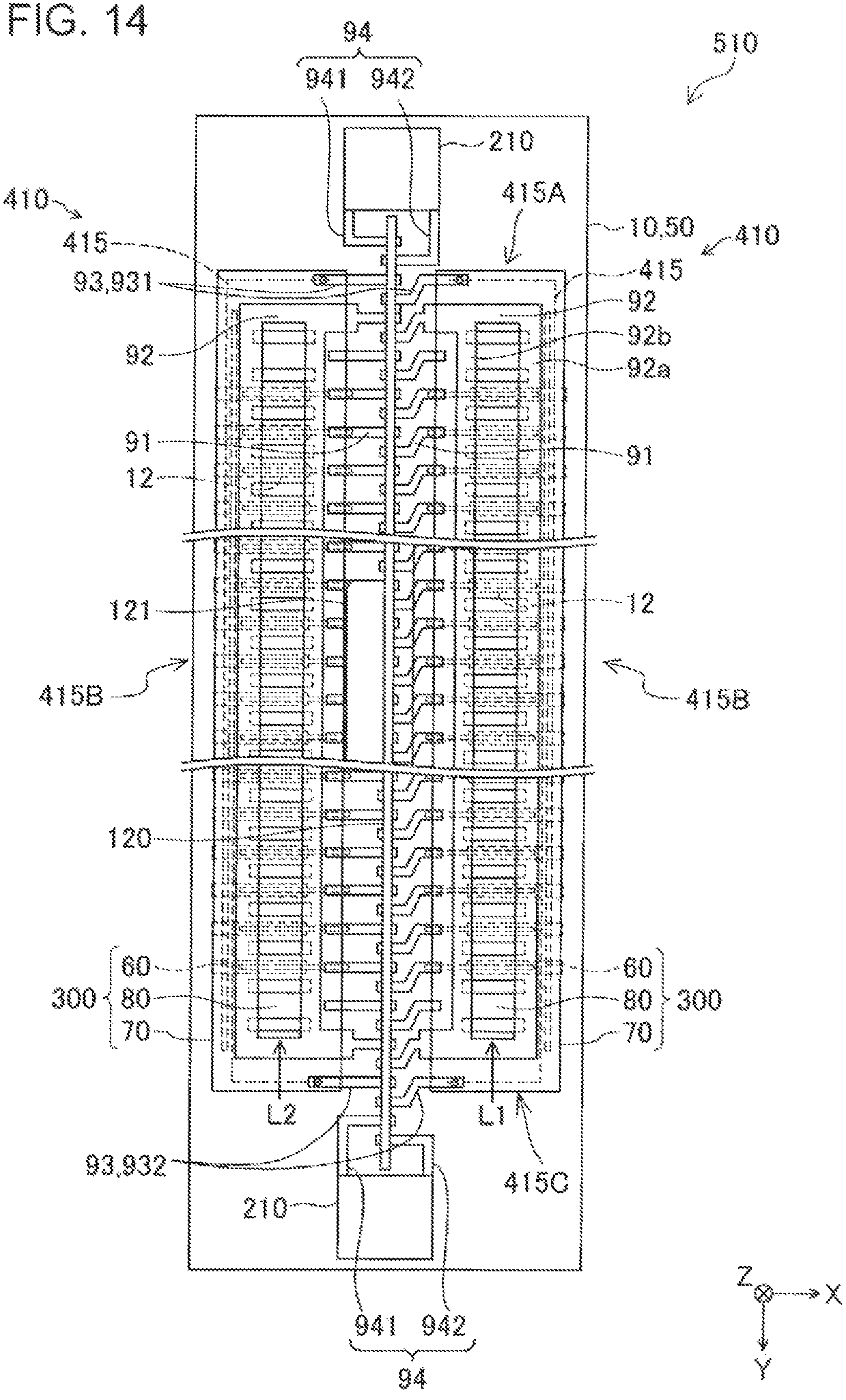
FIG. 14 is a first explanatory diagram illustrating another disposition example of the humidity detection section.

C. Other Embodiments (C1) FIG. 14 is a first explanatory diagram illustrating another disposition example of the humidity detection section. Each of the embodiments describes an example in which, in plan view, the humidity detection sections are disposed at total four positions including positions adjacent to both sides of the first pressure chamber row L1 along the first arrangement direction and positions adjacent to both sides of the second pressure chamber row L2 along the second arrangement direction. On the other hand, as illustrated in FIG. 14, for example, the humidity detection sections 210 may be disposed at positions adjacent to both sides of the wiring substrate 120 along the Y-axis direction which is the first arrangement direction. Alternatively, the humidity detection sections 210 may be disposed only at a position adjacent to any one side of the wiring substrate 120 along the Y-axis direction. With the liquid ejecting head 510 configured as described above, by disposing the humidity detection section 210 at a position separated from the piezoelectric element 300, an influence of noise of the drive signal of the piezoelectric element 300 on the humidity detection section 210 can be reduced. Further, for example, when one holding portion 31 common to a plurality of pressure chamber rows such as the first pressure chamber row L1 and the second pressure chamber row L2 is provided, the number of the humidity detection sections 210 can be reduced, and thus information on humidity can be efficiently acquired.

Figure 15:
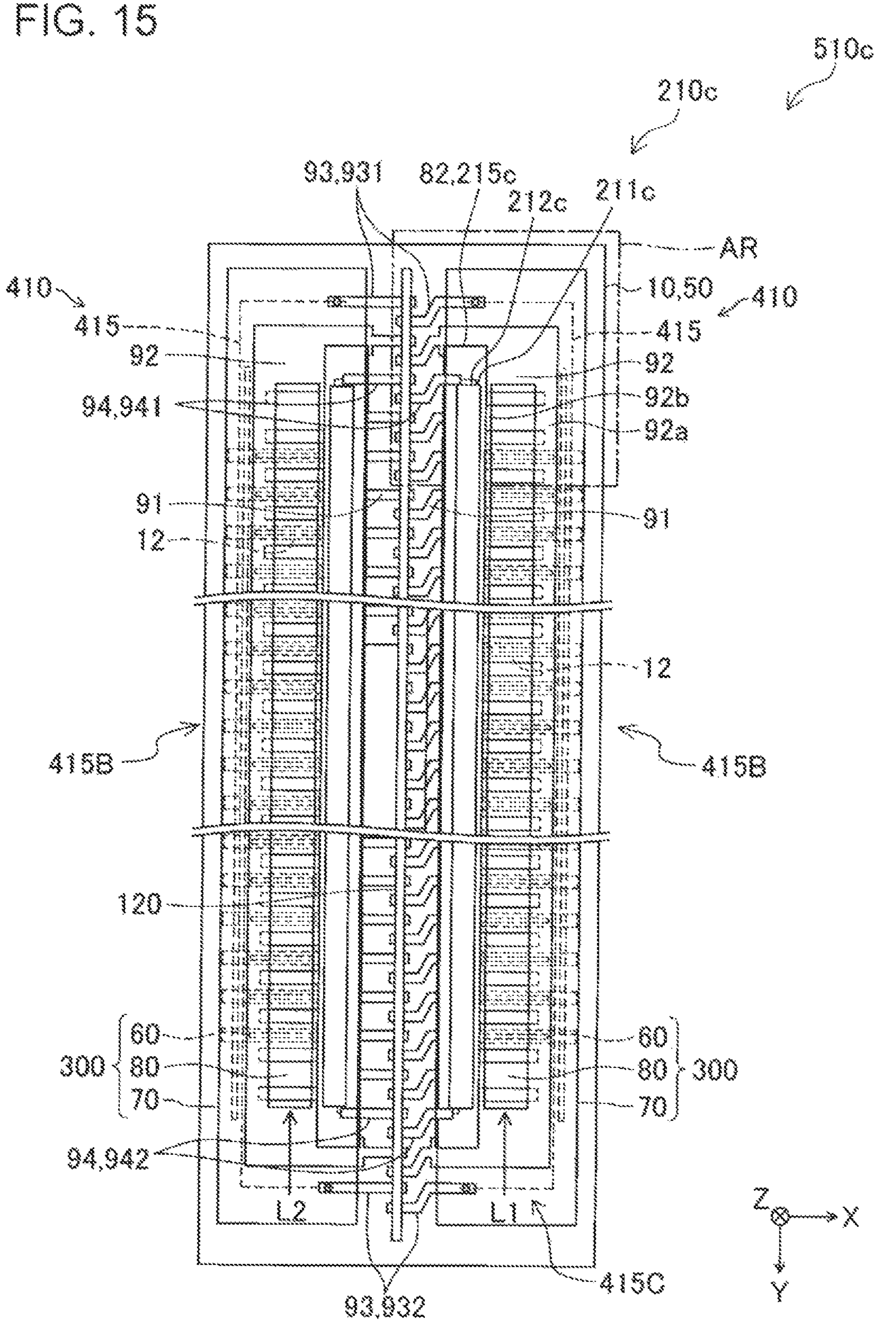
FIG. 15 is a second explanatory diagram illustrating another disposition example of the humidity detection section.

(C2) FIG. 15 is a second explanatory diagram illustrating another disposition example of the humidity detection section. As illustrated in FIG. 15, the humidity detection section 210*c* may be formed with respect to the protective film 82 that is disposed to cover the end portion 80*b* and the surface of the piezoelectric body 70 at the drive electrode end portion position overlapping the end portion 80*b* of the second drive electrode 80. In this case, the protective film 82 functions as the interlayer 215*c*. As illustrated in FIG. 15, in plan view, the first humidity detection wiring 941 and the second humidity detection wiring 942 are disposed at positions that face each other with the plurality of first drive wirings 91 interposed therebetween and are disposed on the inner side of the liquid ejecting head 510*c* with respect to the second drive wiring 92, the plurality of first drive wirings 91 being arranged in the Y-axis direction.

Figure 16:
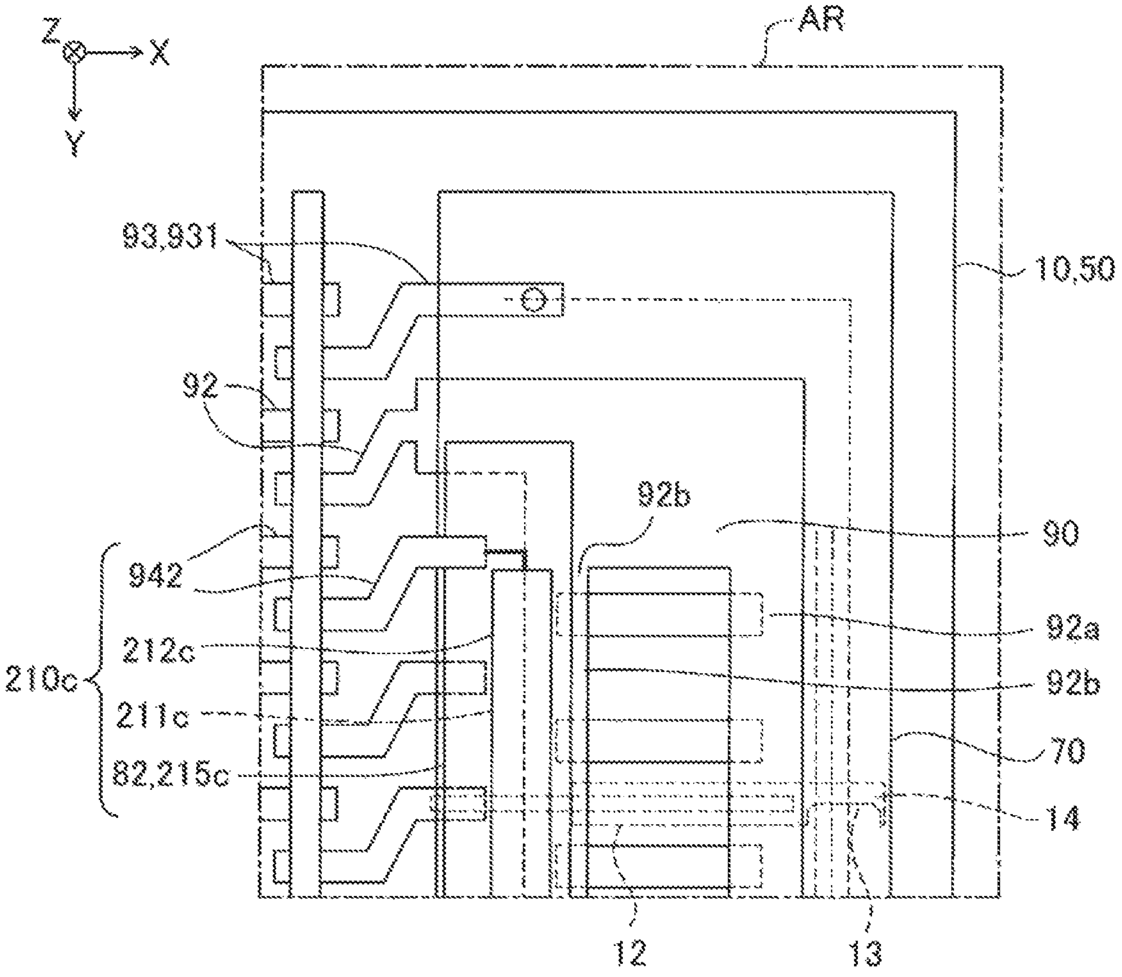
FIG. 16 is an enlarged explanatory diagram illustrating a partial range of FIG. 15.

FIG. 16 is an enlarged explanatory diagram illustrating a partial range AR of FIG. 15. As illustrated in FIG. 16, the first detection electrode 211*c* is disposed on a lower side of the protective film 82 that is at the drive electrode end portion position and serves as the interlayer 215*c*, and the second detection electrode 212*c* is disposed on an upper side of the protective film 82. That is, the first detection electrode 211*c* and the second detection electrode 212*c* are disposed so as to face each other with the protective film 82 interposed therebetween. With the liquid ejecting head 510*c* configured as described above, the same effect as that of the first embodiment can be obtained, and by using the existing protective film 82 as the interlayer 215*c*, an increase in the number of components because of installation of the humidity detection section 210*c* can be suppressed. Although detailed illustration of the shapes of the first detection electrode 211*c* and the second detection electrode 212*c* is omitted, any shape such as a linear shape, a flat plate shape, and a comb shape described above can be used.

(C3) The first embodiment describes an example in which the same material as the material of the protective film 82 is used for the interlayer 215, and the second embodiment describes an example in which the same material as the material of the piezoelectric body 70 is used for the interlayer 215*b*. On the other hand, the same material as the material of the vibration plate 50 may be used for the interlayer. In this case, the first detection electrode 211 may be disposed on an upper side of the vibration plate 50, specifically, an upper side of the insulator film 56, and the second detection electrode 212 may be disposed on a lower side of the vibration plate 50, specifically, a lower side of the elastic film 55. With the liquid ejecting head 510 according to the form, by detecting the capacitance of the vibration plate 50, information on humidity of the vibration plate 50 can be detected with high accuracy. The first detection electrode 211 may be disposed on the upper side of the insulator film 56, and the second detection electrode 212 may be disposed between the insulator film 56 and the elastic film 55. The first detection electrode 211 may be disposed between the insulator film 56 and the elastic film 55, and the second detection electrode 212 may be disposed on the lower side of the elastic film 55.

(C4) The first embodiment describes an example in which the first detection electrode 211 and the second detection electrode 212 are disposed so as to face each other with the interlayer 215 that is interposed therebetween and is formed of the same material as the material of the protective film. In addition, the second embodiment describes an example in which the first detection electrode 211*b* is disposed on the lower side of the piezoelectric body 70 which serves as the interlayer 215*b* and the second detection electrode 212*b* is disposed on the upper side of the piezoelectric body 70. On the other hand, the first detection electrode and the second detection electrode may be provided on the same layer on the upper side or the lower side of the interlayer in a state where the first detection electrode and the second detection electrode are separated from each other and are electrically discontinuous with each other. In the example of FIG. 8, the first detection electrode 211 and the second detection electrode 212 may be exposed and disposed on the upper side of the interlayer 215, or may be disposed between the piezoelectric body 70 and the interlayer 215. In the example of FIG. 12, the first detection electrode 211*b* and the second detection electrode 212*b* may be exposed and disposed on the upper side of the interlayer 215*b* which serves as the piezoelectric body 70, and may be disposed between the piezoelectric body 70 and the vibration plate 50. Even in the liquid ejecting head configured as described above, as in the first embodiment and the second embodiment, by using the capacitance between the first detection electrode and the second detection electrode, information on humidity of the interlayer can be detected with high accuracy.

D. Other Aspects

The present disclosure is not limited to the above-described embodiments, and can be realized in various configurations without departing from the gist of the present disclosure. For example, technical features in the embodiments corresponding to technical features in respective aspects described in outline of the present disclosure can be appropriately replaced or combined in order to solve some or all of the above-described problems or achieve some or all of the above-described effects. Further, as long as the technical feature is not described as essential in the present specification, the technical feature can be appropriately deleted.

(1) According to one aspect of the present disclosure, a liquid ejecting head is provided. A liquid ejecting head includes: a piezoelectric element that includes a first drive electrode, a second drive electrode, and a piezoelectric body, the piezoelectric body being provided between the first drive electrode and the second drive electrode in a lamination direction in which the first drive electrode, the second drive electrode, and the piezoelectric body are laminated; a vibration plate that is provided on one side of the lamination direction with respect to the piezoelectric element and is deformed by driving of the piezoelectric element; a pressure chamber substrate that is provided on the one side of the lamination direction with respect to the vibration plate and is provided with a plurality of pressure chambers; an interlayer that is laminated on at least one of the piezoelectric body, the vibration plate, or the pressure chamber substrate and of which capacitance changes according to humidity; a first detection electrode that is in contact with the interlayer; and a second detection electrode that is in contact with the interlayer and is disposed to be separated from the first detection electrode.

With the liquid ejecting head according to the aspect, by using the capacitance between the first detection electrode and the second detection electrode, information on humidity of the interlayer provided in the piezoelectric element or a member in the vicinity of the piezoelectric element can be detected with high accuracy. Therefore, an influence of humidity on the piezoelectric element or the member in the vicinity of the piezoelectric element can be appropriately acquired.

(2) According to another aspect of the present disclosure, a liquid ejecting apparatus is provided. A liquid ejecting apparatus includes: the liquid ejecting head according to the aspect; a capacitance measurement section that measures capacitance between the first detection electrode and the second detection electrode; and a humidity management section that acquires information on humidity of the interlayer by using the capacitance which is measured by the capacitance measurement section.

With the liquid ejecting head according to the aspect, the liquid ejecting apparatus that can appropriately manage information on the humidity in the member in the liquid ejecting head can be provided.

(3) In the liquid ejecting head according to the aspect, at least one of the first detection electrode or the second detection electrode may be formed of the same material as a material of the first drive electrode.

With the liquid ejecting head according to the aspect, the process of forming at least one of the first detection electrode or the second detection electrode can be shared with the process of forming the first drive electrode, and thus productivity of the liquid ejecting head can be improved.

(4) In the liquid ejecting head according to the aspect, at least one of the first detection electrode or the second detection electrode may be formed of the same material as a material of the second drive electrode.

With the liquid ejecting head according to the aspect, the process of forming at least one of the first detection electrode or the second detection electrode can be shared with the process of forming the second drive electrode, and thus productivity of the liquid ejecting head can be improved.

(5) The liquid ejecting head according to the aspect may further include at least a protective film that is disposed on another side of the lamination direction with respect to the pressure chamber substrate and contains a resin material, the other side of the lamination direction being a side of the lamination direction opposite to the one side on which the vibration plate is provided. The interlayer may be formed of the same material as a material of the protective film.

With the liquid ejecting head according to the aspect, by forming the interlayer using a resin material of which the capacitance is likely to change according to humidity, accuracy of detection of the information on humidity can be improved.

(6) In the liquid ejecting head according to the aspect, the first detection electrode may be disposed on one side of the lamination direction with respect to the interlayer, and the second detection electrode may be disposed on the other side of the lamination direction with respect to the interlayer.

With the liquid ejecting head according to the aspect, as compared with when the first detection electrode and the second detection electrode are formed in the same layer on the upper side or the lower side of the interlayer, the capacitance of the interlayer can be detected with high accuracy.

(7) In the liquid ejecting head according to the aspect, the second detection electrode may include a first electrode portion that extends along a first direction on a surface of the interlayer and a plurality of second electrode portions that are coupled to the first electrode portion on the surface of the interlayer, the plurality of second electrode portions extending in a second direction intersecting with the first direction and arranged to be separated from each other.

With the liquid ejecting head according to the aspect, by forming the second detection electrode with an area smaller than an area of a flat plate, an exposed area of the upper surface of the interlayer can be increased, and thus inhibition of moisture absorption of the interlayer by the second detection electrode can be suppressed or prevented.

(8) In the liquid ejecting head according to the aspect, in plan view of the liquid ejecting head in the lamination direction, the protective film may be disposed at a drive electrode end portion position overlapping an end portion of the first drive electrode or an end portion of the second drive electrode. The first detection electrode may be disposed on the one side of the lamination direction with respect to the protective film that is disposed at the drive electrode end portion position and serves as the interlayer. The second detection electrode may be disposed on the other side of the lamination direction with respect to the protective film that is disposed at the drive electrode end portion position and serves as the interlayer.

With the liquid ejecting head according to the aspect, by using, as the interlayer, the protective film disposed at the drive electrode end portion position, an increase in the number of components because of installation of the humidity detection section can be suppressed.

(9) In the liquid ejecting head according to the aspect, the interlayer may be formed of the same material as a material of the piezoelectric body.

With the liquid ejecting head according to the aspect, information on humidity of the piezoelectric body can be detected with high accuracy, and thus an influence of the humidity on the piezoelectric body can be appropriately acquired.

(10) In the liquid ejecting head according to the aspect, the first detection electrode may be disposed on the one side of the lamination direction with respect to the interlayer. The second detection electrode may be disposed on another side of the lamination direction with respect to the interlayer, the other side of the lamination direction being a side of the lamination direction opposite to the one side.

With the liquid ejecting head according to the aspect, by detecting the capacitance of the piezoelectric body, information on humidity of the piezoelectric body can be detected with high accuracy.

(11) According to still another aspect of the present disclosure, a liquid ejecting apparatus including the liquid ejecting head according to (10) is provided. A liquid ejecting apparatus includes: a capacitance measurement section that measures capacitance between the first detection electrode and the second detection electrode; and a humidity management section that acquires information on humidity of the interlayer by using the capacitance which is measured by the capacitance measurement section. With the liquid ejecting head according to the aspect, the liquid ejecting apparatus that can appropriately manage information on the humidity of the piezoelectric body can be provided.

(12) In the liquid ejecting apparatus according to the aspect, the humidity management section may apply, to the first detection electrode and the second detection electrode, a voltage for generating an electric field closer to a negative coercive electric field of the piezoelectric body than an electric field generated in the piezoelectric body by a drive voltage applied to the piezoelectric body from the first drive electrode and the second drive electrode to drive the piezoelectric element.

With the liquid ejecting head according to the aspect, by using, as the detection voltage, a voltage for generating an electric field in the vicinity of the negative coercive electric field at which the capacitance is substantially maximum, a change in polarization can be increased, and thus sensitivity of humidity measurement can be improved.

(13) In liquid ejecting head according to the aspect, the interlayer may be formed of the same material as a material of the vibration plate.

With the liquid ejecting head according to the aspect, by detecting the capacitance of the vibration plate, information on humidity of the vibration plate can be detected with high accuracy.

(14) In the liquid ejecting head according to the aspect, in plan view of the liquid ejecting head in the lamination direction, the plurality of pressure chambers may be arranged in a first pressure chamber row along a first arrangement direction and in a second pressure chamber row along a second arrangement direction parallel to the first arrangement direction. The interlayer, the first detection electrode, and the second detection electrode may be disposed at least one position of positions adjacent to the first pressure chamber row along the first arrangement direction and positions adjacent to the second pressure chamber row along the second arrangement direction.

With the liquid ejecting head according to the aspect, the humidity detection sections can be individually provided for each of the first pressure chamber row and the second pressure chamber row, and thus information on humidity for each pressure chamber row can be acquired with high accuracy.

(15) In the liquid ejecting head according to the aspect, in plan view of the liquid ejecting head in the lamination direction, the plurality of pressure chambers may be arranged in a first pressure chamber row along a first arrangement direction and in a second pressure chamber row along a second arrangement direction parallel to the first arrangement direction. A wiring substrate that is electrically coupled to the liquid ejecting head may be disposed between the first pressure chamber row and the second pressure chamber row. The interlayer, the first detection electrode, and the second detection electrode may be disposed at positions adjacent to the wiring substrate along the first arrangement direction.

With the liquid ejecting head according to the aspect, by disposing the humidity detection section at a position separated from the piezoelectric element, an influence of noise of the drive signal of the piezoelectric element on the humidity detection section can be reduced.

The present disclosure can also be realized in various aspects other than the liquid ejecting apparatus and the liquid ejecting head. For example, the present disclosure can be realized in aspects of a method for manufacturing a liquid ejecting head, a method for manufacturing a liquid ejecting apparatus, or the like.

The present disclosure is not limited to an ink jet method, and can be applied to any liquid ejecting apparatuses that ejects a liquid other than ink and a liquid ejecting head that is used in the liquid ejecting apparatuses. For example, the present disclosure can be applied to the following various liquid ejecting apparatuses and liquid ejecting heads thereof.

(1) An image recording apparatus such as a facsimile apparatus.
(2) A color material ejecting apparatus used for manufacturing a color filter for an image display apparatus such as a liquid crystal display.
(3) An electrode material ejecting apparatus used for forming electrodes of an organic Electro Luminescence (EL) display, a Field Emission Display (FED), or the like.
(4) A liquid ejecting apparatus that ejects a liquid containing a bioorganic substance used for manufacturing a biochip.
(5) A sample ejecting apparatus as a precision pipette.
(6) A lubricating oil ejecting apparatus.
(7) A resin liquid ejecting apparatus.
(8) A liquid ejecting apparatus that ejects lubricating oil with pinpoint to a precision machine such as a watch or a camera.
(9) A liquid ejecting apparatus that ejects a transparent resin liquid, such as an ultraviolet curable resin liquid, onto a substrate in order to form a micro hemispherical lens (optical lens) or the like used for an optical communication element or the like.
(10) A liquid ejecting apparatus that ejects an acidic or alkaline etching liquid for etching a substrate or the like.
(11) A liquid ejecting apparatus including a liquid consumption head that ejects any other minute amount of droplets.

Further, the "liquid" may be any material that can be consumed by the liquid ejecting apparatus. For example, the "liquid" may be a material in a state when a substance is liquefied, and the "liquid" includes a liquid state material with high or low viscosity and a liquid state material, such as a sol, gel water, other inorganic solvent, organic solvent, solution, liquid resin, and liquid metal (metal melt). Further, the "liquid" includes not only a liquid as a state of a substance but also a liquid in which particles of a functional material made of a solid substance, such as a pigment or a metal particle, are dissolved, dispersed, or mixed in a solvent. Further, the following is mentioned as a typical example of a liquid.

(1) Adhesive main agent and curing agent.
(2) Paint-based paints and diluents, clear paints and diluents.
(3) Main solvent and diluting solvent containing cells of ink for cells.
(4) Metallic leaf pigment dispersion liquid and diluting solvent of ink (metallic ink) that develops metallic luster.
(5) Gasoline/diesel and biofuel for vehicle fuel.
(6) Main ingredients and protective ingredients of medicine.
(7) Light Emitting Diode (LED) fluorescent material and encapsulant.

What is claimed is:

1. A liquid ejecting head comprising:
a piezoelectric element that includes a first drive electrode, a second drive electrode, and a piezoelectric body, the piezoelectric body being provided between the first drive electrode and the second drive electrode in a lamination direction in which the first drive electrode, the second drive electrode, and the piezoelectric body are laminated;
a vibration plate that is provided on one side of the lamination direction with respect to the piezoelectric element and is deformed by driving of the piezoelectric element;
a pressure chamber substrate that is provided on the one side of the lamination direction with respect to the vibration plate and is provided with a plurality of pressure chambers;
an interlayer that is laminated on at least one of the piezoelectric body, the vibration plate, or the pressure chamber substrate and of which capacitance changes according to humidity;
a first detection electrode that is in contact with the interlayer; and
a second detection electrode that is in contact with the interlayer and is disposed to be separated from the first detection electrode.

2. A liquid ejecting apparatus comprising:
the liquid ejecting head according to claim 1;
a capacitance measurement section that measures capacitance between the first detection electrode and the second detection electrode; and
a humidity management section that acquires information on humidity of the interlayer by using the capacitance which is measured by the capacitance measurement section.

3. The liquid ejecting head according to claim 1, wherein
at least one of the first detection electrode or the second detection electrode is formed of the same material as a material of the first drive electrode.

4. The liquid ejecting head according to claim 1, wherein
at least one of the first detection electrode or the second detection electrode is formed of the same material as a material of the second drive electrode.

5. The liquid ejecting head according to claim 1, further comprising:

a protective film that is disposed on another side of the lamination direction with respect to the pressure chamber substrate and contains a resin material, the other side of the lamination direction being a side of the lamination direction opposite to the one side on which the vibration plate is provided, wherein the interlayer is formed of the same material as a material of the protective film.

6. The liquid ejecting head according to claim 5, wherein the first detection electrode is disposed on one side of the lamination direction with respect to the interlayer, and the second detection electrode is disposed on the other side of the lamination direction with respect to the interlayer.

7. The liquid ejecting head according to claim 6, wherein the second detection electrode includes a first electrode portion that extends along a first direction on a surface of the interlayer and a plurality of second electrode portions that are coupled to the first electrode portion on the surface of the interlayer, the plurality of second electrode portions extending in a second direction intersecting with the first direction and arranged to be separated from each other.

8. The liquid ejecting head according to claim 5, wherein in plan view of the liquid ejecting head in the lamination direction, the protective film is disposed at a drive electrode end portion position overlapping an end portion of the first drive electrode or an end portion of the second drive electrode, the first detection electrode is disposed on the one side of the lamination direction with respect to the protective film that is disposed at the drive electrode end portion position and serves as the interlayer, and the second detection electrode is disposed on the other side of the lamination direction with respect to the protective film that is disposed at the drive electrode end portion position and serves as the interlayer.

9. The liquid ejecting head according to claim 1, wherein the interlayer is formed of the same material as a material of the piezoelectric body.

10. The liquid ejecting head according to claim 9, wherein the first detection electrode is disposed on the one side of the lamination direction with respect to the interlayer, and the second detection electrode is disposed on another side of the lamination direction with respect to the interlayer, the other side of the lamination direction being a side of the lamination direction opposite to the one side.

11. A liquid ejecting apparatus comprising:

the liquid ejecting head according to claim 10;

a capacitance measurement section that measures capacitance between the first detection electrode and the second detection electrode; and a humidity management section that acquires information on humidity of the interlayer by using the capacitance which is measured by the capacitance measurement section.

12. The liquid ejecting apparatus according to claim 11, wherein the humidity management section applies, to the first detection electrode and the second detection electrode, a voltage for generating an electric field closer to a negative coercive electric field of the piezoelectric body than an electric field generated in the piezoelectric body by a drive voltage applied to the piezoelectric body from the first drive electrode and the second drive electrode to drive the piezoelectric element.

13. The liquid ejecting head according to claim 1, wherein the interlayer is formed of the same material as a material of the vibration plate.

14. The liquid ejecting head according to claim 1, wherein in plan view of the liquid ejecting head in the lamination direction, the plurality of pressure chambers are arranged in a first pressure chamber row along a first arrangement direction and in a second pressure chamber row along a second arrangement direction parallel to the first arrangement direction, and the interlayer, the first detection electrode, and the second detection electrode are disposed at at least one position of positions adjacent to the first pressure chamber row along the first arrangement direction and positions adjacent to the second pressure chamber row along the second arrangement direction.

15. The liquid ejecting head according to claim 1, wherein in plan view of the liquid ejecting head in the lamination direction, the plurality of pressure chambers are arranged in a first pressure chamber row along a first arrangement direction and in a second pressure chamber row along a second arrangement direction parallel to the first arrangement direction, a wiring substrate that is electrically coupled to the liquid ejecting head is disposed between the first pressure chamber row and the second pressure chamber row, and the interlayer, the first detection electrode, and the second detection electrode are disposed at positions adjacent to the wiring substrate along the first arrangement direction.

* * * * *